US010800937B2

(12) United States Patent
Tanaka et al.

(10) Patent No.: US 10,800,937 B2
(45) Date of Patent: Oct. 13, 2020

(54) METHOD FOR PRODUCING AQUEOUS PIGMENT DISPERSION

(71) Applicant: KAO CORPORATION, Tokyo (JP)

(72) Inventors: Satoshi Tanaka, Wakayama (JP); Takeshi Ashizawa, Barcelona (ES); Teruyuki Fukuda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/061,855

(22) PCT Filed: Dec. 16, 2016

(86) PCT No.: PCT/JP2016/087544
§ 371 (c)(1),
(2) Date: Jun. 13, 2018

(87) PCT Pub. No.: WO2017/104801
PCT Pub. Date: Jun. 22, 2017

(65) Prior Publication Data
US 2019/0309180 A1 Oct. 10, 2019

(30) Foreign Application Priority Data

Dec. 18, 2015 (JP) .................. 2015-247145

(51) Int. Cl.
| | | |
|---|---|---|
| *C09D 11/326* | (2014.01) | |
| *B41M 5/00* | (2006.01) | |
| *C09D 11/033* | (2014.01) | |
| *C09D 11/037* | (2014.01) | |
| *C09D 11/107* | (2014.01) | |

(Continued)

(52) U.S. Cl.
CPC ............ *C09D 11/326* (2013.01); *B41M 5/00* (2013.01); *B41M 5/0023* (2013.01); *C09D 11/033* (2013.01); *C09D 11/037* (2013.01); *C09D 11/10* (2013.01); *C09D 11/106* (2013.01); *C09D 11/107* (2013.01); *C09D 11/322* (2013.01); *C09D 11/324* (2013.01); *C09D 17/00* (2013.01); *C09D 17/001* (2013.01); *C09D 17/005* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS 6,387,168 B1 * 5/2002 Koitabashi ........... C09D 11/322
106/31.28
6,758,559 B1 7/2004 Nakano et al.
(Continued)

FOREIGN PATENT DOCUMENTS

| JP | 2004-203903 A | 7/2004 |
|---|---|---|
| JP | 2006-1971 A | 1/2006 |

(Continued)

OTHER PUBLICATIONS

International Search Report for PCT/JP2016/087544 (PCT/ISA/210) dated Feb. 21, 2017.
(Continued)

*Primary Examiner* — Manish S Shah
(74) *Attorney, Agent, or Firm* — Birch, Stewart, Kolasch & Birch, LLP

(57) ABSTRACT

The present invention relates to [1] a process for producing a pigment water dispersion, including step 1 of mixing a water dispersion (A) formed by dispersing a pigment (I) with a water-dispersible polymer and a water dispersion (B) of a self-dispersible pigment (II) to obtain a water dispersion (C); and step 2 of subjecting the water dispersion (C) obtained in the step 1 to heat treatment at a temperature of not lower than 40° C. to obtain the pigment water dispersion, and [2] a pigment water dispersion containing a pigment (I) dispersed with a water-dispersible polymer and a self-dispersible pigment (II), in which the water-dispersible polymer is adsorbed onto the pigment (I) and the self-dispersible pigment (II).

17 Claims, No Drawings

(51) Int. Cl.
*C09D 17/00* (2006.01)
*C09D 11/324* (2014.01)
*C09D 11/10* (2014.01)
*C09D 11/322* (2014.01)
*C09D 11/106* (2014.01)

(56) References Cited

U.S. PATENT DOCUMENTS

| | | | |
|---|---|---|---|
| 2002/0012035 | A1 | 1/2002 | Mouri et al. |
| 2002/0041317 | A1 | 4/2002 | Kashiwazaki et al. |
| 2003/0048342 | A1 | 3/2003 | Kashiwazaki et al. |
| 2003/0121446 | A1 | 7/2003 | Taniguchi et al. |
| 2005/0027036 | A1* | 2/2005 | Takizawa ............ C09D 11/324 523/160 |
| 2006/0213390 | A1 | 9/2006 | Itano et al. |
| 2009/0176070 | A1 | 7/2009 | Goto et al. |
| 2009/0234063 | A1 | 9/2009 | Sekiyama |
| 2011/0102496 | A1 | 5/2011 | Fukuda |
| 2011/0306708 | A1* | 12/2011 | Hiraishi ............ C09D 11/32 524/90 |
| 2012/0026240 | A1 | 2/2012 | Saito |
| 2012/0154492 | A1* | 6/2012 | Hakiri ............ B41J 2/2107 347/86 |
| 2013/0038660 | A1* | 2/2013 | Hasegawa ............ B41J 2/17503 347/20 |
| 2013/0338319 | A1 | 12/2013 | Takenaka et al. |

FOREIGN PATENT DOCUMENTS

| | | |
|---|---|---|
| JP | 2006-307130 A | 11/2006 |
| JP | 2007-63493 A | 3/2007 |
| JP | 2008-38007 A | 2/2008 |
| JP | 2008-163131 A | 7/2008 |
| JP | 2009-155569 A | 7/2009 |
| JP | 2009-155572 A | 7/2009 |
| JP | 2010-209184 A | 9/2010 |
| JP | 2010-222417 A | 10/2010 |
| JP | 2011-89017 A | 5/2011 |
| JP | 2012-111839 A | 6/2012 |
| JP | 2012-224740 A | 11/2012 |
| JP | 2013-209544 A | 10/2013 |

OTHER PUBLICATIONS

European Patent Office Communication and extended search report issued in the corresponding European Patent Application No. 16875775.5 dated Jun. 19, 2019.

Wen et al., "Organic Optoelectronic Technology," South China University of Technology Press, 1st edition, Aug. 2013 (6 pages total; including an English translation thereof).

* cited by examiner

METHOD FOR PRODUCING AQUEOUS PIGMENT DISPERSION

FIELD OF THE INVENTION

The present invention relates to a pigment water dispersion and a process for producing the pigment water dispersion.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods have become rapidly spread because of various advantages such as easiness of full coloration, low cost, capability of using a plain paper as the printing medium, non-contact with printed characters or images, etc.

In recent years, in order to impart good weathering resistance and water resistance to the printed materials, an ink for ink-jet printing which contains a pigment as a colorant has been extensively used in the ink-jet printing methods.

In the ink using the pigment, the pigment particles are dispersed in an aqueous medium. For this reason, it is known that the ink tends to need a prolonged drying time after the printing owing to slow absorption or no absorption of liquid components thereof and therefore tends to be deteriorated in fixing properties. In addition, it is also known that the ink tends to be dried or thickened inside of nozzles in a print head owing to precipitation or aggregation of the pigment particles and therefore tends to be deteriorated in ejection properties. In consequence, it has been attempted to improve fixing properties and ejection properties of the ink.

For example, JP 2007-63493A (Patent Literature 1) discloses an ink for ink-jet printing which contains at least one resin-dispersible pigment that can be dispersed in an aqueous medium by a polymer dispersant, and a self-dispersible pigment containing at least one ionic group bonded to a surface of respective pigment particles directly or through the other atomic group, and is excellent in not only color developability, but also fixing properties, high-lighter fastness, rub fastness, quality of printed characters or images, anti-bleeding properties, etc.

JP 2006-1971A (Patent Literature 2) discloses a process for producing a water-based ink for ink-jet printing which includes the step of subjecting a water dispersion of colorant-containing water-insoluble polymer particles to heat treatment at a temperature of not lower then 40° C. In Patent Literature 2, it is also described that the ink after being produced suffers from less change in viscosity and is excellent in storage stability.

JP 2006-307130A (Patent Literature 3) discloses a pigment dispersion obtained by subjecting an aqueous pigment dispersion containing a self-dispersible pigment but containing no dispersing resin to heat treatment, which is free of change in properties such as viscosity, etc., even when allowed to stand for a long period of time, and has stable ink-jet ejection properties and is excellent in reliability.

SUMMARY OF THE INVENTION

The present invention relates to a process for producing a pigment water dispersion, including the following steps 1 and 2:

Step 1: mixing a water dispersion (A) formed by dispersing a pigment (I) with a water-dispersible polymer and a water dispersion (B) of a self-dispersible pigment (II) to obtain a water dispersion (C); and Step 2: subjecting the water dispersion (C) obtained in the step 1 to heat treatment at a temperature of not lower than 40° C. to obtain the pigment water dispersion.

DETAILED DESCRIPTION OF THE INVENTION

The ink described in Patent Literature 1 still fails to exhibit improved ejection stability that is capable of ejecting the ink in a continuous and stable manner (hereinafter also referred to merely as "continuous ejection stability"). Also, the ink described in Patent Literature 2 still fails to exhibit improved optical density when printed on a high water-absorbing printing medium such as a plain paper. In addition, the ink described in Patent Literature 3 still fails to exhibit improved fixing properties when printed on a low-water absorbing printing medium used in commercial printing applications which is formed of a low-liquid absorbing paper such as a coated paper or a non-liquid absorbing resin film. Therefore, it tends to be difficult to satisfy all of high optical density on a high-liquid absorbing printing medium, excellent fixing properties on a low-water absorbing printing medium, and excellent continuous ejection stability.

The present invention relates to a pigment water dispersion that is excellent in continuous ejection stability, optical density on a high-liquid absorbing printing medium, and fixing properties on a low-water absorbing printing medium, and a process for producing the pigment water dispersion.

Meanwhile, the term "printing" as used in the present specification is a concept that includes printing or typing operation for printing characters or images, and the term "printed material" as used in the present invention is a concept that includes printed matters or typed materials on which characters or images are printed. In addition, the term "high-water absorbing" as used in the present specification is intended to include a concept of "high-liquid absorbing", and the high-water absorbing printing medium means a printing medium having a water absorption of not less than 10 g/m$^2$ as measured under the condition that a contact time between the printing medium and pure water is 100 ms, whereas the term "low-water absorbing" as used in the present specification is intended to include both concepts of low-liquid absorbing and non-liquid absorbing, and the low-water absorbing printing medium means a printing medium having a water absorption of not less than 0 g/m$^2$ and less than 10 g/m$^2$ as measured under the condition that a contact time between the printing medium and pure water is 100 ms. Furthermore, the term "aqueous medium" as used in the present specification means such a medium that water has a largest content among components contained in the medium.

The present inventors have found that by subjecting a mixed water dispersion obtained by mixing a water dispersion formed by dispersing a pigment with a water-dispersible polymer and a water dispersion of a self-dispersible pigment to heat treatment at a temperature of not lower than 40° C., it is possible to produce a pigment water dispersion that is excellent in continuous ejection stability, optical density on a high-water absorbing printing medium, and fixing properties on a low-water absorbing printing medium.

That is, the present invention relates to the following aspects [1] and [2].

[1] A process for producing a pigment water dispersion, including the following steps 1 and 2:

Step 1: mixing a water dispersion (A) formed by dispersing a pigment (I) with a water-dispersible polymer and a water dispersion (B) of a self-dispersible pigment (II) to obtain a water dispersion (C); and Step 2: subjecting the water dispersion (C) obtained in the step 1 to heat treatment at a temperature of not lower than 40° C. to obtain the pigment water dispersion.

[2] A pigment water dispersion containing a pigment (I) dispersed with a water-dispersible polymer and a self-dispersible pigment (II), in which the water-dispersible polymer is adsorbed onto the pigment (I) and the self-dispersible pigment (II).

In accordance with the present invention, by performing the production process including the aforementioned steps 1 and 2, it is possible to obtain a pigment water dispersion that contains the pigments (I) and (II) onto which the water-dispersible polymer is adsorbed, and has advantages of all of these components, and it is therefore possible to provide such a pigment water dispersion that is excellent in continuous ejection stability, optical density on a high-water absorbing printing medium and fixing properties on a low-water absorbing printing medium.

[Process for Producing Pigment Water Dispersion]

The process for producing the pigment water dispersion according to the present invention (hereinafter also referred to merely as a "pigment water dispersion") includes the following steps 1 and 2.

Step 1: mixing a water dispersion (A) formed by dispersing a pigment (I) with a water-dispersible polymer and a water dispersion (B) of a self-dispersible pigment (II) to obtain a water dispersion (C); and Step 2: subjecting the water dispersion (C) obtained in the step 1 to heat treatment at a temperature of not lower than 40° C. to obtain the pigment water dispersion.

The pigment water dispersion according to the present invention is excellent in optical density on a high-water absorbing printing medium (hereinafter also referred to merely as "optical density") or fixing properties on a low-water absorbing printing medium (hereinafter also referred to merely as "fixing properties") when compounded in a water-based ink, and is capable of obtaining good printed materials. For this reason, the pigment water dispersion according to the present invention can be suitably used as a pigment water dispersion for flexographic printing, gravure printing or ink-jet printing. In addition, the pigment water dispersion according to the present invention is excellent in continuous ejection stability when compounded in a water-based ink and used in ink-jet printing methods, and therefore is preferably used as a pigment water dispersion for ink-jet printing.

Meanwhile, in the present specification, the "water dispersion (A) formed by dispersing the pigment (I) with the water-dispersible polymer" as used herein is also referred to merely as a "water dispersion (A)", whereas the "water dispersion (B) of the self-dispersible pigment (II)" as used herein is also referred to merely as a "water dispersion (B)".

In accordance with the present invention, it is possible to obtain a pigment water dispersion that is excellent in continuous ejection stability, optical density and fixing properties. The reason why the aforementioned advantageous effect can be attained by the present invention is considered as follows though it is not clearly determined yet.

That is, in the water dispersion formed by dispersing the pigment (I) with the water-dispersible polymer, the pigment particles onto which the water-dispersible polymer is adsorbed are dispersed in an aqueous medium by the action of a steric repulsive group and an electrostatic repulsive group present therein. Whereas, in the case of the water dispersion of the self-dispersible pigment, the self-dispersible pigment is dispersed in an aqueous medium only by the action of an electrostatic repulsive group present therein. For this reason, the self-dispersible pigment in the water dispersion tends to be rapidly aggregated on a printing medium and exhibit high optical density when printed on a high-water absorbing printing medium such as a plain paper, as compared to the water dispersion formed by dispersing the pigment (I) with the water-dispersible polymer. On the contrary, the water dispersion of the self-dispersible pigment tends to be deteriorated in continuous ejection stability owing to high likelihood of aggregation of the pigment therein, and therefore tends to fail to fully spread over a low-water absorbing printing medium and exhibit good fixing properties.

On the other hand, the water dispersion formed by dispersing the pigment (I) with the water-dispersible polymer is excellent in continuous ejection stability owing to excellent dispersion stability thereof, and can fully spread over a low-water absorbing printing medium to cover the surface of the printing medium with the polymer, and therefore can exhibit excellent fixing properties. On the contrary, the water dispersion formed by dispersing the pigment (I) with the water-dispersible polymer tends to be hardly aggregated on the paper surface of a high-water absorbing printing medium, so that there tends to occur such a so-called "strike-through" phenomenon that the pigment is penetrated into the printing medium and causes tinting of even a rear surface of the printing medium such as a paper (hereinafter also referred to merely as "strike-through"). Thus, the water dispersion tends to suffer from poor optical density thereof.

When the water dispersion of the self-dispersible pigment and the water dispersion formed by dispersing the pigment (I) with the water-dispersible polymer are simply mixed, the resulting ink exhibits high optical density and high fixing properties to some extent. However, the ink tends to be deteriorated in dispersion stability of the pigments therein owing to the difference in dispersing mechanism between the pigments contained in both the water dispersions, and therefore tends to be hardly improved in continuous ejection stability. However, when subjecting a mixed water dispersion prepared by mixing the water dispersion of the self-dispersible pigment and the water dispersion formed by dispersing the pigment (I) with the water-dispersible polymer to heat treatment at a temperature of not lower than 40° C., the water-dispersible polymer acting for dispersing the pigment (I) is also adsorbed onto the self-dispersible pigment so that the dispersing mechanisms of the pigments contained in both the water dispersions become identical to each other. As a result, it is considered that an ink prepared from the resulting water dispersion can be prevented from suffering from strike-through, and is excellent in all of continuous ejection stability, optical density and fixing properties, without causing deterioration in dispersion stability of the pigments in the ink.

<Pigment (I)>

The pigment (I) used in the present invention may be either an organic pigment or an inorganic pigment. However, a self-dispersible pigment is not included in the pigment (I).

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the organic pigment used in the present invention is not particularly limited, and there may be used any chromatic color pigments having a yellow color, a magenta color, a cyan color, a red color, a blue color, an orange color, a green color, etc.

These organic pigments may be used alone or in combination of any two or more thereof at an optional ratio.

Examples of the inorganic pigment include carbon blacks, metal oxides and the like. Of these inorganic pigments, in particular, carbon blacks are preferably used for black inks. The carbon blacks may include furnace blacks, thermal lamp blacks, acetylene blacks and channel blacks.

The DBP oil absorption of the carbon blacks is preferably not more than 150 mL/100 g, more preferably not more than 140 mL/100 g, even more preferably not more than 120 mL/100 g, further even more preferably not more than 100 mL/100 g, still further even more preferably not more than 80 mL/100 g and still further even more preferably not more than 60 mL/100 g from the viewpoint of improving fixing properties of the resulting pigment water dispersion, and is also preferably not less than 35 mL/100 g, more preferably not less than 40 mL/100 g, even more preferably not less than 45 mL/100 g and further even more preferably not less than 50 mL/100 g from the viewpoint of improving optical density of the resulting pigment water dispersion.

The DBP oil absorption as used herein means an oil absorption as measured by DBP method, more specifically, the value measured according to ASTM D2414-65T.

The volatile content of the carbon blacks is preferably not more than 10% by mass, more preferably not more than 6.0% by mass, even more preferably not more than 3.0% by mass and further even more preferably not more than 2.0% by mass, and is also preferably not less than 0.5% by mass, more preferably not less than 1.0% by mass and even more preferably not less than 1.5% by mass, from the viewpoint of improving continuous ejection stability, optical density and fixing properties of the resulting pigment water dispersion. The volatile content as used herein is a residual amount of the carbon blacks after being heated at 950° C. for 7 minutes (on the basis of ASTM D1620-60).

Specific examples of the commercially available carbon blacks include "MONARCH 717" (DBP oil absorption: 53; volatile content: 1.0% by mass), "MONARCH 800" (DBP oil absorption: 68; volatile content: 1.5% by mass), "MONARCH 880" (DBP oil absorption: 105; volatile content: 1.5% by mass), "MONARCH 1100" (DBP oil absorption: 50; volatile content: 2.0% by mass), "REGAL 250" (DBP oil absorption: 46; volatile content: 1.0% by mass), "REGAL 330R" (DBP oil absorption: 70; volatile content: 1.0% by mass), "REGAL 415R" (DBP oil absorption: 55; volatile content: 1.0% by mass) and "MOGUL L" (DBP oil absorption: 60; volatile content: 4.5% by mass) all available from Cabot Corporation; and "NIPex 70" (DBP oil absorption: 123; volatile content: 1.2% by mass), "NIPex 60" (DBP oil absorption: 114; volatile content: 1.0% by mass), "NIPex 160IQ" (DBP oil absorption: 128; volatile content: 5.0% by mass), "Printex 35" (DBP oil absorption: 42; volatile content: 0.5% by mass), "Printex 55" (DBP oil absorption: 46; volatile content: 1.2% by mass), "Printex 75" (DBP oil absorption: 49; volatile content: 1.2% by mass) and "Printex 85" (DBP oil absorption: 48; volatile content: 1.2% by mass) all available from Evonik Degussa GmbH; and "#900" (DBP oil absorption: 56; volatile content: 1.5% by mass), "#1000" (DBP oil absorption: 56; volatile content: 3.0% by mass), "#2600" (DBP oil absorption: 77; volatile content: 1.8% by mass), "#45L" (DBP oil absorption: 45; volatile content: 1.1% by mass) and "MCF88" (DBP oil absorption: 55; volatile content: 1.5% by mass) all available from Mitsubishi Chemical Corporation. The unit of the aforementioned DBP oil absorption is "mL/100 g".

The aforementioned carbon blacks may be used alone or in combination of any two or more thereof at an optional ratio.

The hues of the pigments (I) and (II) when used in combination with each other may be the same or different from each other. From the viewpoint of improving optical density of the resulting pigment water dispersion, the hues of the pigments (I) and (II) are preferably identical to each other.

<Self-Dispersible Pigment (II)>

The self-dispersible pigment (II) used in the present invention means an inorganic or organic pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group to thereby render the pigment dispersible in an aqueous medium without using a surfactant or a resin. Examples of the other atom group used herein include an alkanediyl group having not less than 1 and not more than 12 carbon atoms, a phenylene group and a naphthylene group.

The amount of the hydrophilic functional group to be bonded to the surface of the self-dispersible pigment is not particularly limited, and is preferably not less than 100 μmol and not more than 3,000 μmol per 1 g of the self-dispersible pigment. The amount of a carboxy group as the hydrophilic functional group bonded to the surface of the self-dispersible pigment is preferably not less than 200 μmol and not more than 700 μmol per 1 g of the self-dispersible pigment.

Specific examples of commercially available products of the self-dispersible pigment include "CAB-O-JET 200", "CAB-O-JET 300", "CAB-O-JET 352K", "CAB-O-JET 250C", "CAB-O-JET 260M", "CAB-O-JET 270Y", "CAB-O-JET 450C", "CAB-O-JET 465M", "CAB-O-JET 470Y" and "CAB-O-JET 480V" all available from Cabot Corporation, "BONJET CW-1" and "BONJET CW-2" both available from Orient Chemical Industries Co., Ltd., "Aqua-Black 162" available from Tokai Carbon Co., Ltd., and "SDP-100", "SDP-1000" and "SDP-2000" all available from Sensient Technologies Corporation.

The aforementioned pigments may be used alone or in combination of a any two or more thereof at an optional ratio.

<Water-Dispersible Polymer>

The water dispersion (A) of the pigment (I) used in the present invention contains the water-dispersible polymer. The water-dispersible polymer as used herein means a polymer having a capability of dispersing the pigment in water or an aqueous medium containing water as a main component at an ordinary temperature. From the viewpoint of well dispersing the pigment in an aqueous medium, the water-dispersible polymer is preferably a hydrophilic polymer containing a functional group having a good affinity to water. The hydrophilic polymer may be either a water-soluble polymer containing a hydrophobic functional group or a water-insoluble polymer containing a hydrophilic functional group. Among these polymers, from the viewpoint of stably dispersing the pigment in an aqueous medium, preferred is the water-insoluble polymer containing a hydrophilic functional group. Examples of the hydrophilic functional group include an anionic hydrophilic group such as a carboxy group and a sulfonic group, and a cationic hydrophilic group such as a quaternary ammonium group.

Examples of the water-dispersible polymer include polyesters, polyurethanes and vinyl-based polymers. Among these polymers, from the viewpoint of improving dispersion stability of the pigment water dispersion as well as from the viewpoint of improving continuous ejection stability and fixing properties of the resulting ink, preferred are vinyl-based polymers obtained by subjecting vinyl monomers to addition polymerization.

The water-dispersible polymer is preferably a vinyl-based polymer that is produced by copolymerizing a monomer mixture containing (a) a hydrophobic monomer (hereinafter also referred to merely as a "component (a)") and (b) an ionic monomer (hereinafter also referred to merely as a "component (b)") (such a mixture is hereinafter also referred to merely as a "monomer mixture") from the viewpoint of improving dispersion stability of the pigment water dispersion as well as from the viewpoint of improving continuous ejection stability and fixing properties of the resulting ink.

Also, it is preferred that the water-dispersible polymer further contains (c) a nonionic monomer (hereinafter also referred to merely as a "component (c)") as a monomer component thereof from the viewpoint of improving dispersion stability of the pigment water dispersion as well as from the viewpoint of improving continuous ejection stability and fixing properties of the resulting ink.

The vinyl-based polymer contains a constitutional unit derived from the component (a) and a constitutional unit derived from the component (b), and preferably further contains a constitutional unit derived from the component (c).

[(a) Hydrophobic Monomer]

The hydrophobic monomer (a) is preferably used as a monomer component of the water-dispersible polymer from the viewpoint of improving dispersion stability of the pigment water dispersion. The term "hydrophobic" of the hydrophobic monomer (a) as used in the present invention means that the amount of the monomer which can be dissolved in 100 g of ion-exchanged water as measured at 25° C. is less than 10 g.

The hydrophobic monomer (a) is preferably at least one monomer selected from the group consisting of an aromatic group-containing monomer, a (meth)acrylate containing a hydrocarbon group derived from an aliphatic alcohol and a macromer, and more preferably at least one monomer selected from the group consisting of an aromatic group-containing monomer and a macromer.

The aromatic group-containing monomer is preferably a vinyl monomer containing an aromatic group having not less than 6 and not more than 22 carbon atoms, and more preferably at least one monomer selected from the group consisting of a styrene-based monomer and an aromatic group-containing (meth)acrylate. The molecular weight of the aromatic group-containing monomer is preferably less than 500.

As the styrene-based monomer, preferred is at least one monomer selected from the group consisting of styrene and 2-methyl styrene, and more preferred is styrene.

As the aromatic group-containing (meth)acrylate, preferred is at least one monomer selected from the group consisting of benzyl (meth)acrylate and phenoxyethyl (meth)acrylate, and more preferred is benzyl (meth)acrylate.

Among these monomers, from the viewpoint of improving dispersion stability of the pigment water dispersion as well as from the viewpoint of improving continuous ejection stability and fixing properties of the resulting ink, preferred is the aromatic group-containing (meth)acrylate, and more preferred is benzyl (meth)acrylate. In addition, the aromatic group-containing (meth)acrylate may also be used in combination with the styrene-based monomer.

Meanwhile, the term "(meth)acrylate" as used in the present specification means at least one compound selected from the group consisting of an acrylate and a methacrylate, and the "(meth)acrylate" as described hereinafter is also defined in the same way.

As the (meth)acrylate containing a hydrocarbon group derived from an aliphatic alcohol, preferred are those (meth) acrylates containing a hydrocarbon group derived from an aliphatic alcohol having not less than 1 and not more than 22 carbon atoms, more preferred are those (meth)acrylates containing an alkyl group having not less than 1 and not more than 22 carbon atoms, and even more preferred are those (meth)acrylates containing an alkyl group having not less than 6 and not more than 18 carbon atoms. Examples of the (meth)acrylate containing a hydrocarbon group derived from an aliphatic alcohol include methyl (meth)acrylate, ethyl (meth)acrylate, propyl (meth)acrylate, butyl (meth) acrylate, amyl (meth)acrylate, cyclohexyl (meth)acrylate, 2-ethylhexyl (meth)acrylate, octyl (meth)acrylate, decyl (meth)acrylate, dodecyl (meth)acrylate, stearyl (meth)acrylate, isopropyl (meth)acrylate, isobutyl (meth)acrylate, tert-butyl (meth)acrylate, isoamyl (meth)acrylate, isooctyl (meth)acrylate, isodecyl (meth)acrylate, isododecyl (meth) acrylate and isostearyl (meth)acrylate.

As the hydrophobic monomer (a), a macromer is preferably used. The macromer is in the form of a compound containing a polymerizable functional group at one terminal end thereof and having a number-average molecular weight of not less than 500 and not more than 100,000. From the viewpoint of improving dispersion stability of the pigment water dispersion as well as from the viewpoint of improving continuous ejection stability and fixing properties of the resulting ink, the number-average molecular weight of the macromer is preferably not less than 1,000 and not more than 10,000.

Meanwhile, the number-average molecular weight of the macromer is the value that is measured by gel permeation chromatography using chloroform containing 1 mmol/L of dodecyl dimethylamine as a solvent and using a polystyrene as a reference standard substance.

As the polymerizable functional group bonded to one terminal end of the macromer, preferred are a methacryloyloxy group and an acryloyloxy group, and more preferred is a methacryloyloxy group.

As the macromer, from the viewpoint of improving dispersion stability of the pigment water dispersion as well as from the viewpoint of improving continuous ejection stability and fixing properties of the resulting ink, preferred is at least one macromer selected from the group consisting of an aromatic group-containing monomer-based macromer and a silicone-based macromer, and more preferred is an aromatic group-containing monomer-based macromer.

Examples of an aromatic group-containing monomer constituting the aromatic group-containing monomer-based macromonomer include the same aromatic group-containing monomers as described with respect to the above hydrophobic monomer (a). Among these aromatic group-containing monomers, preferred are styrene and benzyl (meth)acrylate, and more preferred is styrene.

Specific examples of commercially available products of the styrene-based macromer include "AS-6(S)", "AN-6(S)" and "HS-6(S)" (tradenames) all available from Toagosei Co., Ltd., etc.

Examples of the silicone-based macromer include organopolysiloxanes containing a polymerizable functional group at one terminal end thereof, etc.

[(b) Ionic Monomer]

The ionic monomer (b) is preferably used as a monomer component of the water-dispersible polymer from the viewpoint of improving dispersion stability of the pigment water dispersion as well as from the viewpoint of improving continuous ejection stability and fixing properties of the resulting ink.

Examples of the ionic monomer (b) include an anionic monomer and a cationic monomer. Among these ionic monomers, from the viewpoint of improving dispersion stability of the pigment water dispersion as well as from the viewpoint of improving continuous ejection stability and fixing properties of the resulting ink, preferred is the anionic monomer.

Examples of the anionic monomer include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid and 3-sulfopropyl (meth)acrylate.

Specific examples of the phosphoric acid monomers include vinylphosphonic acid, vinyl phosphate, bis(meth-acryloxyethyl)phosphate, diphenyl-2-acryloyloxyethyl phosphate and diphenyl-2-methacryloyloxyethyl phosphate.

Among the anionic monomers, from the viewpoint of improving dispersion stability of the pigment water dispersion as well as from the viewpoint of improving continuous ejection stability and fixing properties of the resulting ink, preferred are the carboxylic acid monomers, more preferred is at least one monomer selected from the group consisting of acrylic acid and methacrylic acid, and even more preferred is methacrylic acid.

[(c) Nonionic Monomer]

The nonionic monomer (c) is preferably used as a monomer component of the water-dispersible polymer from the viewpoint of improving dispersion stability of the pigment water dispersion as well as from the viewpoint of improving continuous ejection stability and fixing properties of the resulting ink.

Examples of the nonionic monomer (c) include hydroxyalkyl (meth)acrylates such as 2-hydroxyethyl (meth)acrylate and 3-hydroxypropyl (meth)acrylate; polyalkylene glycol (meth)acrylates such as polypropylene glycol (n=2 to 30 wherein n represents an average molar number of addition of oxyalkylene groups: hereinafter defined in the same way) (meth)acrylates; alkoxy polyalkylene glycol (meth)acrylates such as methoxy polyethylene glycol (n=1 to 30) (meth) acrylates; and aralkoxy polyalkylene glycol (meth)acrylates such as phenoxy (ethylene glycol/propylene glycol copolymer) (n=1 to 30 in which n for ethylene glycol: 1 to 29) (meth)acrylates.

Among these nonionic monomers, preferred is at least one monomer selected from the group consisting of polyalkylene glycol (meth)acrylates, alkoxy polyalkylene glycol (meth) acrylates and aralkoxy polyalkylene glycol (meth)acrylates, more preferred is at least one monomer selected from the group consisting of polypropylene glycol (n=2 to 30) (meth) acrylates, alkoxy polyethylene glycol (meth)acrylates and phenoxy (ethylene glycol/propylene glycol copolymer) (meth)acrylates, and even more preferred are alkoxy polyethylene glycol (meth)acrylates.

Specific examples of commercially available products of the component (c) include "NK ESTER M-20G", "NK ESTER M-40G", "NK ESTER M-90G" and "NK ESTER EH-4E" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400" and the like, "BLEMMER PP-500", "BLEMMER PP-800" and the like, "BLEMMER AP-150", "BLEMMER AP-400", "BLEMMER AP-550" and the like, "BLEMMER 50PEP-300", "BLEMMER 50POEP-800B", "BLEMMER 43PAPE-600B" and the like all available from NOF Corporation. Of these commercially available products of the components (c), from the viewpoint of improving optical density of the resulting ink, "NK ESTER EH-4E" (octoxy polyethylene glycol monomethacrylate; average molar number of addition of ethyleneoxide: 4) is preferably used.

The aforementioned components (a) to (c) may be respectively used alone or in combination of any two or more thereof.

Upon production of the polymer, the contents of the aforementioned components (a) to (c) in the monomer mixture (contents of non-neutralized components; hereinafter defined in the same way), i.e., the contents of the constitutional units derived from the components (a) to (c), respectively, in the water-dispersible polymer are as follows.

The content of the component (a) is preferably not less than 40% by mass, more preferably not less than 45% by mass, even more preferably not less than 48% by mass and further even more preferably not less than 50% by mass, and is also preferably not more than 85% by mass, more preferably not more than 80% by mass, even more preferably not more than 75% by mass and further even more preferably not more than 60% by mass, from the viewpoint of improving dispersion stability of the pigment water dispersion as well as from the viewpoint of improving continuous ejection stability and fixing properties of the resulting ink.

The content of the component (b) is preferably not less than 10% by mass, more preferably not less than 13% by mass and even more preferably not less than 15% by mass, and is also preferably not more than 25% by mass, more preferably not more than 23% by mass, even more preferably not more than 22% by mass and further even more preferably not more than 20% by mass, from the viewpoint of improving dispersion stability of the pigment water dispersion as well as from the viewpoint of improving continuous ejection stability and fixing properties of the resulting ink.

In the case of further using the component (c), the content of the component (c) is preferably not less than 0.10% by mass, more preferably not less than 10% by mass and even more preferably not less than 20% by mass, and is also preferably not more than 40% by mass, more preferably not more than 35% by mass, even more preferably not more than 32% by mass and further even more preferably not more than 30% by mass, from the viewpoint of improving dispersion stability of the pigment water dispersion as well as from the viewpoint of improving continuous ejection stability and fixing properties of the resulting ink.

(Production of Water-Dispersible Polymer)

The water-dispersible polymer may be produced by copolymerizing a monomer mixture containing the aforementioned hydrophobic monomer (a) and ionic monomer (b), preferably further containing the aforementioned nonionic monomer (c) and the other monomers, by known polymerization methods. Among the known polymerization methods, preferred is a solution polymerization method.

The organic solvent used in the solution polymerization method is not particularly limited, and methyl ethyl ketone, toluene, methyl isobutyl ketone, etc., are preferably used from the viewpoint of attaining good copolymerizability of the monomers.

The polymerization may be carried out in the presence of a polymerization initiator or a chain transfer agent. As the polymerization initiator, preferred are azo compounds, and more preferred is 2,2'-azobis(2,4-dimethylvaleronitrile).

As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C., more preferably not lower than 60° C. and even more preferably not lower than 70° C., and is also preferably not higher than 90° C. and more preferably not higher than 85° C. The polymerization time is preferably not less than 1 hour, more preferably not less than 4 hours and even more preferably not less than 6 hours, and is also preferably not more than 20 hours, more preferably not more than 15 hours and even more preferably not more than 10 hours. In addition, the polymerization is preferably conducted in a nitrogen gas atmosphere or an atmosphere of an inert gas such as argon.

After completion of the polymerization reaction, unreacted monomers, etc., may be removed from the obtained reaction solution by reprecipitation, membrane separation, chromatography, extraction, etc.

From the viewpoints of improving dispersion stability of the pigment water dispersion, from the viewpoint of improving continuous ejection stability of the resulting ink as well as from the viewpoint of obtaining printed materials that have high optical density and excellent fixing properties and are free of occurrence of strike-through, the weight-average molecular weight of the water-dispersible polymer is preferably not less than 5,000, more preferably not less than 10,000, even more preferably not less than 20,000 and further even more preferably not less than 30,000, and is also preferably not more than 500,000, more preferably not more than 300,000, even more preferably not more than 200,000, further even more preferably not more than 150,000 and still further even more preferably not more than 100,000. Meanwhile, the weight-average molecular weight of the water-dispersible polymer may be measured by the method described in Examples below.

[Crosslinked Polymer]

From the viewpoints of improving continuous ejection stability of the resulting ink, the water dispersion (A) is preferably a water dispersion obtained by dispersing the pigment (I) with a crosslinked water-dispersible polymer.

Meanwhile, the crosslinked water-dispersible polymer is hereinafter also referred to merely as a "crosslinked polymer".

The crosslinked polymer is produced by subjecting the water-dispersible polymer to crosslinking reaction using a crosslinking agent.

The crosslinking agent is preferably in the form of a compound containing at least two reactive groups in a molecule thereof from the viewpoints of improving continuous ejection stability of the resulting ink. The molecular weight of the crosslinking agent is preferably not less than 120 and more preferably not less than 150, and is also preferably not more than 2,000, more preferably not more than 1,500 and even more preferably not more than 1,000, from the viewpoints of enhancing reactivity of the crosslinking reaction and improving storage stability of the water dispersion containing the resulting crosslinked polymer as well as from the viewpoints of improving continuous ejection stability of the resulting ink.

The number of the reactive groups contained in the crosslinking agent is preferably not less than 2 and not more than 4, more preferably not less than 2 and not more than 3 and even more preferably 2 from the viewpoint of conducting the crosslinking reaction at high efficiency. The reactive group is preferably at least one group selected from the group consisting of a hydroxy group, an epoxy group, an aldehyde group, an amino group, a carboxy group, an oxazoline group and an isocyanate group. Specific examples of the crosslinking agents containing the aforementioned reactive groups include the following compounds (i) to (vii).

Example of the compound (i) containing two or more hydroxy groups in a molecule thereof (hereinafter also referred to merely as "hydroxy group-containing compounds") include polyhydric alcohols such as ethylene glycol, diethylene glycol, triethylene glycol, polyethylene glycol, glycerin, polyglycerin, propylene glycol, polypropylene glycol, 1,4-butane diol, 1,5-pentanediol, 1,6-hexanediol, neopentyl alcohol, diethanol amine, triethanol amine, polyvinyl alcohol, pentaerythritol, sorbitol, sorbitan, glucose, mannitol, mannitan, sucrose and glucose.

Example of the compound (ii) containing two or more epoxy groups in a molecule thereof (hereinafter also referred to merely as "epoxy group-containing compounds") include polyglycidyl ethers such as ethylene glycol diglycidyl ether, polyethylene glycol diglycidyl ether, polypropylene glycol diglycidyl ether, glycerol triglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ethers.

Examples of the compound (iii) containing two or more aldehyde groups in a molecule thereof (hereinafter also referred to merely as "aldehyde group-containing compounds") include polyaldehydes such as glutaraldehyde and glyoxal.

Examples of the compound (iv) containing two or more amino groups in a molecule thereof (hereinafter also referred to merely as "amino group-containing compounds") include polyamines such as ethylenediamine and polyethyleneimine.

Examples of the compound (v) containing two or more carboxy groups in a molecule thereof (hereinafter also referred to merely as "carboxy group-containing compounds") include polycarboxylic acids such as oxalic acid, malonic acid, succinic acid, fumaric acid, maleic acid and adipic acid.

Examples of the compound (vi) containing two or more oxazoline groups in a molecule thereof (hereinafter also referred to merely as "oxazoline group-containing compounds") include compounds containing an aliphatic group or an aromatic group to which not less than 2, preferably not less than 2 and not more than 3 oxazoline groups are bonded. Specific examples of the compound (vi) containing two or more oxazoline groups in a molecule thereof include bisoxazoline compounds such as 2,2'-bis(2-oxazoline), 1,3-phenylene-bisoxazoline and 1,3-benzobisoxazoline, and compounds containing an end oxazoline group obtained by reacting any of the bisoxazoline compounds with a polybasic carboxylic acid.

Examples of the compound (vii) containing two or more isocyanate groups in a molecule thereof (hereinafter also referred to merely as "isocyanate group-containing compounds") include organic polyisocyanates and isocyanate group-terminated prepolymers. Specific examples of the organic polyisocyanates include aliphatic diisocyanates such as hexamethylene diisocyanate and 2,2,4-trimethylhexamethylene diisocyanate; aromatic diisocyanates such as tolylene-2,4-diisocyanate and phenylene diisocyanate; alicyclic diisocyanates; aromatic triisocyanates; and modified products of these polyisocyanates such as urethane-modified polyisocyanates.

The isocyanate group-terminated prepolymers may be obtained by reacting the organic polyisocyanate or the modified product thereof with a low-molecular weight polyol, etc.

Among these crosslinking agents, preferred is the epoxy group-containing compound (ii), more preferred is at least one compound selected from the group consisting of ethylene glycol diglycidyl ether, polyethylene glycol diglycidyl ether, trimethylolpropane polyglycidyl ether and pentaerythritol polyglycidyl ether, even more preferred is polyethylene glycol diglycidyl ether, and further even more preferred is diethylene glycol diglycidyl ether.

The water-dispersible polymer used in the present invention preferably contains a reactive group (crosslinkable functional group) capable of reacting with the crosslinking agent. Examples of the reactive group include at least one group selected from the group consisting of an anionic group such as a carboxy group, a sulfonic group, a sulfuric group, a phosphonic group and a phosphoric group, an amino group, a hydroxy group, an isocyanate group and an epoxy group. Among these reactive groups, preferred is at least one group selected from the group consisting of an anionic group, an amino group and a hydroxy group, more preferred is an anionic group, and even more preferred is a carboxy group.

The preferred combinations of the reactive group of the water-dispersible polymer and the crosslinking agent are as follows.

When the reactive group of the water-dispersible polymer is an anionic group such as a carboxy group, a sulfonic group, a sulfuric group, a phosphonic group and a phosphoric group, the crosslinking agent is preferably at least one compound selected from the group consisting of the aforementioned hydroxy group-containing compound (i), epoxy group-containing compound (ii), amino group-containing compound (iv), oxazoline group-containing compound (vi) and isocyanate group-containing compound (vii).

When the reactive group of the water-dispersible polymer is an amino group, the crosslinking agent is preferably at least one compound selected from the group consisting of the aforementioned epoxy group-containing compound (ii), aldehyde group-containing compound carboxy group-containing compound (v) and isocyanate group-containing compound (vii).

When the reactive group of the water-dispersible polymer is a hydroxy group, the crosslinking agent is preferably at least one compound selected from the group consisting of the aforementioned aldehyde group-containing compound carboxy group-containing compound (v) and isocyanate group-containing compound (vii).

When the reactive group of the water-dispersible polymer is an isocyanate group or an epoxy group, the crosslinking agent is preferably at least one compound selected from the group consisting of the aforementioned hydroxy group-containing compound (i), amino group-containing compound (iv) and carboxy group-containing compound (v).

Among these combinations of the reactive group of the water-dispersible polymer and the crosslinking agent, from the viewpoint of well controlling the crosslinking reaction of the water-dispersible polymer such that the resulting crosslinked polymer has an adequate crosslinking structure, more preferred is the combination of the water-dispersible polymer containing at least one reactive group selected from the group consisting of an anionic group such as a carboxy group, a sulfonic group and a phosphoric group, an amino group and a hydroxy group with the epoxy group-containing compound (ii), and even more preferred is the combination of the water-dispersible polymer containing a carboxy group with the epoxy group-containing compound (ii).

The polymer containing an anionic group such as a carboxy group, a sulfonic group and a phosphoric group, an amino group, a hydroxy group, an epoxy group, an isocyanate group, etc., as the reactive group (crosslinkable functional group) capable of reacting with the crosslinking agent may be produced by copolymerizing a polymerizable monomer mixture that contains a monomer containing the aforementioned reactive group upon production of the water-dispersible polymer.

As the polymer containing a salt-forming group such as an anionic group, an amino group, etc., as the reactive group capable of reacting with the crosslinking agent, there may be used those polymers obtained by copolymerizing the aforementioned salt-forming group-containing monomer. Also, as the polymer containing a hydroxy group as the reactive group capable of reacting with the crosslinking agent, there may be used those polymers obtained by copolymerizing the aforementioned hydroxy group-containing monomer.

As the polymer containing an epoxy group as the reactive group capable of reacting with the crosslinking agent, there may be used those polymers obtained by copolymerizing an epoxy group-containing monomer, more specifically, glycidyl (meth)acrylate.

As the polymer containing an isocyanate group as the reactive group capable of reacting with the crosslinking agent, there may be used (1) those polymers obtained by copolymerizing an isocyanate group-containing monomer, for example, isocyanato-ethyl (meth)acrylate, (2) those polymers obtained by copolymerizing an isocyanate-terminated prepolymer produced from an unsaturated polyester polyol and an isocyanate, and the like.

(Production of Pigment Water Dispersion)

The pigment water dispersion of the present invention can be efficiently produced by the process including the following steps 1 and 2:

Step 1: mixing a water dispersion (A) formed by dispersing the pigment (I) with the water-dispersible polymer and a water dispersion (B) of the self-dispersible pigment (II) to obtain a water dispersion (C); and Step 2: subjecting the water dispersion (C) obtained in the step 1 to heat treatment at a temperature of not lower than 40° C. to obtain the pigment water dispersion.

<Step 1>

The step 1 is the step of mixing the water dispersion (A) and the water dispersion (B) to obtain the water dispersion (C). In the present invention, from the viewpoint of fully atomizing the pigment and allowing the water-dispersible polymer to be adsorbed to the surface of the pigment particles to thereby improve continuous ejection stability and fixing properties of the resulting ink, it is preferred that the aforementioned production process further includes the following step 1-1 prior to the step 1.

Step 1-1: subjecting a pigment mixture containing the water-dispersible polymer, an organic solvent, the pigment (I) and water to dispersion treatment and then removing the organic solvent from the resulting dispersion to obtain the water dispersion (A) formed by dispersing the pigment (I) with the water-dispersible polymer.

[Step 1-1]

(Organic Solvent)

In the step 1-1, it is preferred that the organic solvent used therein has a high affinity to the water-dispersible polymer, and on the other hand, exhibits a low solubility in water used as a main solvent. More specifically, it is preferred that the solubility of the organic solvent in water as measured at 20° C. is less than 40% by mass.

Examples of the preferred organic solvent include at least one solvent selected from the group consisting of aliphatic alcohols, ketones, ethers and esters. Among these organic solvents, from the viewpoint of improving wettability to the pigment and adsorptivity of the water-dispersible polymer to the pigment, more preferred are ketones, and even more preferred is methyl ethyl ketone.

The mass ratio of the water-dispersible polymer to the organic solvent [water-dispersible polymer/organic solvent] in step 1-1 is preferably not less than 0.10, more preferably not less than 0.20 and even more preferably not less than 0.25, and is also preferably not more than 0.60, more preferably not more than 0.50 and even more preferably not more than 0.45, from the viewpoint of improving wettability to the pigment and adsorptivity of the water-dispersible polymer to the pigment.

(Neutralizing Agent)

In the step 1-1, from the viewpoint of improving dispersion stability of the pigment water dispersion as well as from the viewpoint of improving continuous ejection stability and fixing properties of the resulting ink, a neutralizing agent is preferably used. When using the neutralizing agent, the neutralization is preferably conducted such that the pH value of the water dispersion (A) lies within the range of not less than 7 and not more than 11.

Examples of the neutralizing agent used in the step 1-1 include hydroxides of alkali metals, ammonia and organic amines. Of these neutralizing agents, from the viewpoint of improving dispersion stability of the pigment water dispersion as well as from the viewpoint of improving continuous ejection stability and fixing properties of the resulting ink, preferred are hydroxides of alkali metals and ammonia, and more preferred are hydroxides of alkali metals.

Specific examples of the hydroxides of alkali metals include lithium hydroxide, sodium hydroxide, potassium hydroxide and cesium hydroxide. Of these hydroxides of alkali metals, preferred is sodium hydroxide.

The neutralizing agent is preferably used in the form of an aqueous neutralizing agent solution from the viewpoint of sufficiently promoting neutralization of the polymer. From the viewpoint of sufficiently promoting neutralization of the polymer, the concentration of the aqueous neutralizing agent solution is preferably not less than 3% by mass, more preferably not less than 7% by mass and even more preferably not less than 10% by mass, and is also preferably not more than 30% by mass, more preferably not more than 25% by mass and even more preferably not more than 20% by mass.

The mass ratio of the neutralizing agent to the organic solvent [neutralizing agent/organic solvent] in step 1-1 is preferably not less than 0.010, more preferably not less than 0.020 and even more preferably not less than 0.025, and is also preferably not more than 0.10, more preferably not more than 0.060 and even more preferably not more than 0.050, from the viewpoint of improving adsorptivity of the water-dispersible polymer to the pigment and promoting neutralization of the polymer to enhance dispersibility of the pigment particles as well as from the viewpoint of preventing formation of coarse particles to improve continuous ejection stability of the resulting ink.

The neutralizing agent and the aqueous neutralizing agent solution are respectively used alone or in a mixture of any two or more kinds thereof.

The degree of neutralization of the water-dispersible polymer is preferably not less than 60 mol %, more preferably not less than 80 mol % and even more preferably not less than 100 mol %, and is also preferably not more than 400 mol %, more preferably not more than 200 mol % and even more preferably not more than 150 mol %, from the viewpoint of improving dispersion stability of the pigment water dispersion as well as from the viewpoint of improving continuous ejection stability of the resulting ink.

The degree of neutralization as used herein means the value obtained by dividing a mole equivalent value of the neutralizing agent by a molar amount of the anionic group in the water-dispersible polymer. Inherently, the degree of neutralization of the polymer does not exceed 100 mol %. However, in the present invention, since the degree of neutralization of the polymer is calculated from an amount of the neutralizing agent used, if the neutralizing agent is used in an excessive amount relative to the polymer, the degree of neutralization of the polymer will exceed 100 mol %. The aforementioned anionic group may include a carboxy group of the ionic monomer, etc.

In addition, in the case where the volatile base is used as the neutralizing agent, it is possible to suitably control not only the degree of neutralization of the dispersion in the course of production of the water dispersion (A), but also the degree of neutralization of each of the water dispersion (C) and the pigment water dispersion which are obtained after producing the water dispersion (A). More specifically, the volatile base such as ammonia, etc., is used as the neutralizing agent, and the neutralizing agent is charged in an excessive amount based on a molar amount of the anionic group of the polymer in the course of production of the water dispersion (A), and then removed after completion of production of the water dispersion (A), whereby it is possible to control the degree of neutralization of the water dispersion to a desired value. In such a case, the amount of the volatile base used as the neutralizing agent is preferably not less than 0 mol %, and is also preferably not more than 300 mol %, more preferably not more than 100 mol % and even more preferably not more than 50 mol %.

The content of the pigment (I) in the pigment mixture is preferably not less than 5.0% by mass, more preferably not less than 8.0% by mass and even more preferably not less than 10% by mass, and is also preferably not more than 30% by mass, more preferably not more than 25% by mass and even more preferably not more than 20% by mass, from the viewpoint of improving dispersion stability of the pigment water dispersion and enhancing productivity of the pigment water dispersion as well as from the viewpoint of improving continuous ejection stability and optical density of the resulting ink.

The content of the water-dispersible polymer in the pigment mixture is preferably not less than 1.5% by mass, more preferably not less than 2.0% by mass and even more preferably not less than 2.5% by mass, and is also preferably not more than 15% by mass, more preferably not more than 10% by mass and even more preferably not more than 7.0% by mass, from the viewpoint of improving dispersion stability of the pigment water dispersion as well as from the viewpoint of improving continuous ejection stability and fixing properties of the resulting ink.

The content of the organic solvent in the pigment mixture is preferably not less than 10% by mass, more preferably not less than 13% by mass and even more preferably not less than 15% by mass, and is also preferably not more than 30% by mass, more preferably not more than 25% by mass and even more preferably not more than 20% by mass, from the viewpoint of improving wettability to the pigment and adsorptivity of the polymer to the pigment.

The content of water in the pigment mixture is preferably not less than 50% by mass, more preferably not less than 60% by mass and even more preferably not less than 65% by mass, and is also preferably not more than 80% by mass and more preferably not more than 75% by mass, from the viewpoint of improving dispersion stability of the pigment water dispersion and enhancing productivity of the pigment water dispersion.

The mass ratio of the pigment (I) to the water-dispersible polymer [pigment (I)/water-dispersible polymer] in the pigment mixture is preferably from 80/20 to 50/50, more preferably from 75/25 to 60/40 and even more preferably from 70/30 to 65/45, from the viewpoint of obtaining printed materials that are excellent in fixing properties and free of occurrence of strike-through, from the viewpoint of improving dispersion stability of the pigment water dispersion as well as from the viewpoint of improving continuous ejection stability of the resulting ink.

Upon production of the water dispersion (A), the aforementioned pigment mixture is further subjected to dispersing treatment to obtain a dispersion treatment product. The dispersing method for obtaining the dispersion treatment product is not particularly limited. The pigment particles may be atomized into fine particles having a desired average particle size by subjecting the pigment mixture to a substantial dispersion treatment only. However, it is preferred that the pigment mixture is first subjected to a preliminary dispersion treatment, and then to the substantial dispersion treatment by applying a shear stress thereto so as to control the average particle size of the obtained pigment particles to a desired value.

The temperature used in the preliminary dispersion treatment upon production of the water dispersion (A) is preferably not lower than 0° C., and is also preferably not higher than 40° C., more preferably not higher than 20° C. and even more preferably not higher than 10° C.

The dispersing time of the aforementioned treatment is preferably not less than 1 hour, and is also preferably not more than 30 hours, more preferably not more than 10 hours and even more preferably not more than 5 hours.

When subjecting the aforementioned mixture to the preliminary dispersion treatment, there may be used ordinary mixing and stirring devices such as an anchor blade and a disper blade. Of these mixing and stirring devices, preferred are high-speed stirring mixers.

As a means for applying a shear stress to the pigment mixture in the substantial dispersion treatment, there may be used, for example, kneading machines such as roll mills, kneaders and the like, high-pressure homogenizers such as "Microfluidizer" (tradename) available from Microfluidics Corporation, and media-type dispersers such as paint shakers and beads mills. Examples of the commercially available media-type dispersers include "Ultra Apex Mill" (tradename) available from Kotobuki Industries Co., Ltd., and "Pico Mill" (tradename) available from Asada Iron Works Co., Ltd. These devices may be used in combination of any two or more thereof. Among these devices, the high-pressure homogenizers are preferably used from the viewpoint of reducing the particle size of the pigment.

In the case where the substantial dispersion treatment is conducted using the high-pressure homogenizer, the particle size of the pigment may be adjusted to a desired value by controlling the treating pressure and the number of passes of the pigment mixture through the homogenizer used in the substantial dispersion treatment.

The treating pressure used in the substantial dispersion treatment is preferably not less than 60 MPa, more preferably not less than 100 MPa and even more preferably not less than 150 MPa, and is also preferably not more than 250 MPa, more preferably not more than 200 MPa and even more preferably not more than 180 MPa. Also, the number of passes of the pigment mixture through the homogenizer used in the substantial dispersion treatment is preferably not less than 3 times, more preferably not less than 10 times and even more preferably not less than 15 times, and is also preferably not more than 30 times, more preferably not more than 25 times and even more preferably not more than 20 times.

The aforementioned organic solvent is removed from the resulting dispersion treatment product to thereby obtain the water dispersion (A).

The water dispersion (A) can be obtained by removing the organic solvent from the dispersion treatment product by conventionally known methods.

From the viewpoint of suppressing formation of aggregates in the course of removing the organic solvent, from the viewpoint of improving dispersion stability of the pigment water dispersion as well as from the viewpoint of improving continuous ejection stability of the resulting ink, it is preferred that water is added to the dispersion treatment product prior to removal of the organic solvent therefrom to suitably control a mass ratio of the organic solvent to water [organic solvent/water] in the dispersion treatment product. The mass ratio of the organic solvent to water [organic solvent/water] in the dispersion treatment product is preferably not less than 0.15 and more preferably not less than 0.20, and is also preferably not more than 0.40 and more preferably not more than 0.30.

In addition, the concentration of non-volatile components (solid content) in the dispersion treatment product obtained after controlling the mass ratio of the organic solvent to water therein is preferably not less than 5.0% by mass, more preferably not less than 10% by mass and even more preferably not less than 15% by mass, and is also preferably not more than 30% by mass, more preferably not more than 20% by mass and even more preferably not more than 18% by mass, from the viewpoints of suppressing formation of aggregates in the course of removing the organic solvent as well as from the viewpoint of enhancing productivity of the pigment water dispersion. Meanwhile, in the step 1-1, a part of water contained in the aforementioned dispersion treatment product may be removed simultaneously with the organic solvent.

Examples of the apparatus for removing the organic solvent used in the step 1-1 include a thin film distillation apparatus such as a batch simple distillation device, a reduced pressure distillation device and a flush evaporator, a rotary distillation device and a stirring evaporator. Among these apparatuses, from the viewpoint of efficiently removing the organic solvent, preferred are a rotary distillation device and a stirring evaporator, more preferred is a rotary distillation device, and even more preferred is a rotary evaporator.

The temperature of the dispersion treatment product upon removing the organic solvent therefrom may be appropriately selected depending upon the kind of organic solvent to be removed. The temperature of the dispersion treatment product upon removing the organic solvent therefrom under reduced pressure is preferably not lower than 40° C., and is also preferably not higher than 80° C., more preferably not higher than 70° C. and even more preferably not higher than 65° C. The pressure of the reaction system upon removal of the organic solvent is preferably not less than 0.01 MPa and more preferably not less than 0.02 MPa, and is also preferably not more than 0.5 MPa, more preferably not more than 0.2 MPa, even more preferably not more than 0.1 MPa, further even more preferably not more than 0.05 MPa and still further even more preferably not more than 0.03 MPa. The time required upon removal of the organic solvent is preferably not less than 1 hour, more preferably not less than 2 hours and even more preferably not less than 5 hours, and is also preferably not more than 24 hours, more preferably not more than 12 hours, even more preferably not more than 10 hours and further even more preferably not more than 7 hours.

The organic solvent is preferably substantially completely removed from the thus obtained water dispersion (A). However, the residual organic solvent may be present in the water dispersion unless the objects and advantageous effects of the present invention are adversely affected by the residual organic solvent. The content of the residual organic solvent in the resulting water dispersion is preferably not more than 1.0% by mass, more preferably not more than 0.10% by mass and even more preferably not more than 0.010% by mass.

[Crosslinking Step]

In the step 1-1, after removing the organic solvent, the aforementioned crosslinking agent may be further added to the resulting water dispersion to subject the water-dispersible polymer in the water dispersion to crosslinking reaction with the crosslinking agent and thereby obtain the water dispersion (A) formed by dispersing the pigment (I) with the crosslinked water-dispersible polymer.

As the method of crosslinking the water-dispersible polymer, from the viewpoints of improving storage stability of the water dispersion and facilitating production of the crosslinked water-dispersible polymer, there is preferably used the method of mixing the water dispersion containing the water-dispersible polymer with the crosslinking agent to subject the water-dispersible polymer to crosslinking reaction with the crosslinking agent. As the crosslinking agent used in the aforementioned method, there may be mentioned the same crosslinking agents as described above.

The catalyst, solvent, reaction temperature and reaction time used in the crosslinking reaction, etc., may be suitably controlled by appropriately selecting the crosslinking agent used therein. The temperature used in the crosslinking reaction is preferably not lower than 40° C. and not higher than 95° C., and the time of the crosslinking reaction is preferably not less than 0.5 hour and more preferably not less than 1 hour, and is also preferably not more than 10 hours and more preferably not more than 5 hours.

The amount of the crosslinking agent used in the crosslinking reaction is preferably not less than 0.50 part by mass, more preferably not less than 0.70 part by mass, even more preferably not less than 0.85 part by mass, further even more preferably not less than 1.0 part by mass and still further even more preferably 1.5 parts by mass on the basis of 100 parts by mass of the water-dispersible polymer from the viewpoints of improving continuous ejection stability of the resulting ink, and is also preferably not more than 9.5 parts by mass, more preferably not more than 8.0 parts by mass, even more preferably not more than 7.5 parts by mass, further even more preferably not more than 7.0 parts by mass, still further even more preferably not more than 6.5 parts by mass and still further even more preferably not more than 6.0 parts by mass on the basis of 100 parts by mass of the water-dispersible polymer from the viewpoint of improving continuous ejection stability of the resulting ink.

<Water Dispersion (A)>

In the water dispersion (A), the pigment (I) and the water-dispersible polymer as solid components are dispersed in an aqueous medium containing water as a main component, and the water dispersion (A) is in the form of a water dispersion of the pigment particles obtained by dispersing the pigment (I) with the water-dispersible polymer. The configuration of the pigment particles dispersed with the water-dispersible polymer may include such a configuration that the pigment is enclosed within the polymer.

Meanwhile, the water-dispersible polymer means either one or both of the crosslinked water-dispersible polymer (crosslinked polymer) and the non-crosslinked water-dispersible polymer (hereinafter also referred to merely as a "non-crosslinked polymer").

The concentration of the non-volatile components (solid content) in the water dispersion (A) is preferably not less than 10% by mass, more preferably not less than 15% by mass and even more preferably not less than 18% by mass, and is also preferably not more than 30% by mass, more preferably not more than 25% by mass and even more preferably not more than 22% by mass, from the viewpoint of improving dispersion stability of the pigment water dispersion as well as from the viewpoint of facilitating production of the pigment water dispersion.

The pigment particles that are dispersed with the water-dispersible polymer are in the form of particles containing the pigment (I) as a main component, preferably in the form of particles constituted of at least the pigment (I) and the water-dispersible polymer, and more preferably in the form of the water-dispersible polymer particles containing the pigment (I). Examples of the configuration of the pigment particles that are dispersed with the water-dispersible polymer include the particle configuration in which the pigment (I) is enclosed within the water-dispersible polymer, the particle configuration in which the pigment (I) is uniformly dispersed in the water-dispersible polymer, and the particle configuration in which the pigment (I) is exposed onto the surface of the respective water-dispersible polymer particles, and a mixture of these configurations may also be used.

The mass ratio of the pigment (I) to the water-dispersible polymer [pigment (I)/water-dispersible polymer] in the water dispersion (A) is preferably from 80/20 to 50/50, more preferably from 75/25 to 60/40 and even more preferably from 70/30 to 65/45, from the viewpoint of obtaining printed materials that are excellent in fixing properties and free of occurrence of strike-through, from the viewpoint of improving dispersion stability of the pigment water dispersion as well as from the viewpoint of improving continuous ejection stability of the resulting ink.

The average particle size of the pigment particles that are dispersed with the water-dispersible polymer in the water dispersion (A) is preferably not less than 40 nm, more preferably not less than 50 nm and even more preferably not less than 60 nm, and is also preferably not more than 200 nm, more preferably not more than 150 nm and even more preferably not more than 130 nm, from the viewpoint of improving dispersion stability of the pigment water dispersion, from the viewpoint of improving continuous ejection stability of the resulting ink, as well as from the viewpoint of obtaining printed materials that have high optical density and are excellent in fixing properties and free of occurrence of strike-through. The average particle size of the pigment particles may be measured by the method described in Examples below.

<Water Dispersion (B)>

In the water dispersion (B), the self-dispersible pigment (II) as a solid component is dispersed in an aqueous medium containing water as a main component.

The concentration of the non-volatile components (solid content) in the water dispersion (B) is preferably not less than 5.0% by mass, more preferably not less than 10% by mass and even more preferably not less than 12% by mass, and is also preferably not more than 25% by mass and more preferably not more than 20% by mass, from the viewpoints of improving dispersion stability of the pigment water dispersion as well as from the viewpoint of facilitating production of the pigment water dispersion.

[Mixing Step]

The method of mixing the water dispersion (A) and the water dispersion (B) in the step 1 is not particularly limited. The mixing may be conducted, for example, by using a conventionally known mixing device such as a homomixer, a homodisper, a wave rotor, a homogenizer, a disperser, a paint conditioner, a ball mill, a magnetic stirrer and a mechanical stirrer.

The method of adding the water dispersion (A) and the water dispersion (B) is not particularly limited. However, it is preferred that the water dispersion (B) is added to the water dispersion (A) either at one time or in a split-addition manner.

The mass ratio of the pigment (I) to the pigment (II) [(I)/(II)] in the step 1 is preferably from 90/10 to 10/90, more preferably from 90/10 to 25/75, even more preferably from 90/10 to 30/70, further even more preferably from 90/10 to 40/60, still further even more preferably from 90/10 to 50/50 and still further even more preferably from 90/10 to 60/40 from the viewpoint of exhibiting good synergistic effect of both the pigments to improve continuous ejection stability and fixing properties of the resulting ink.

The mass ratio of the pigment (I) to the pigment (II) [(I)/(II)] in the pigment water dispersion in the step 1 is preferably from 90/10 to 10/90, more preferably from 85/15 to 15/85, even more preferably from 80/20 to 20/80, further even more preferably from 70/30 to 20/80, still further even more preferably from 60/40 to 20/80 and still further even more preferably from 60/40 to 30/70 from the viewpoint of exhibiting good synergistic effect of both the pigments to improve optical density and fixing properties of the resulting ink.

In the step 1, a neutralizing agent is preferably used, and the degree of neutralization using the neutralizing agent is not particularly limited. The pH value of the finally obtained water dispersion is preferably not less than 3.5 and more preferably not less than 4.5, and is also preferably not more than 11 and more preferably not more than 10. As the neutralizing agent, there may be used the same neutralizing agents as described above.

<Step 2>

In the step 2, the water dispersion (C) obtained in the step 1 is subjected to heat treatment at a temperature of not lower than 40° C. to obtain the pigment water dispersion according to the present invention.

The method of subjecting the water dispersion (C) to the heat treatment is not particularly limited. It is preferred that the water dispersion (C) is filled in a closed container and then heated in a constant temperature device such as a temperature controlled bath and a thermostat while allowing the water dispersion to stand therein or while stirring such that the temperature of the water dispersion (C) is adjusted to not lower than 40° C.

The temperature used in the heat treatment in the step 2 is not lower than 40° C. and preferably not lower than 50° C., and is also preferably not higher than 100° C., more preferably not higher than 90° C. and even more preferably not higher than 70° C. from the viewpoints of improving dispersion stability of the pigment water dispersion as well as from the viewpoints of allowing the water-dispersible polymer to be adsorbed onto the pigments (I) and (II) without any damage to advantages of these pigments.

The time of the heat treatment in the step 2 is preferably not less than 0.5 hour, more preferably not less than 1 hour, even more preferably not less than 2 hours and further even more preferably not less than 4 hours, and is also preferably not more than 10 hours, more preferably not more than 8 hours and even more preferably not more than 6 hours.

[Pigment Water Dispersion]

The pigment water dispersion obtained by the production process of the present invention is preferably in the form of a dispersion in which two kinds of pigments (I) and (II) and the water-dispersible polymer are dispersed in an aqueous medium containing water as a main component, and the water-dispersible polymer is adsorbed onto the surface of each of the pigments (I) and (II). More specifically, the pigment water dispersion according to the present invention is preferably in the form of a pigment water dispersion that contains the pigment (I) dispersed with the water-dispersible polymer and the self-dispersible pigment (II) in which the water-dispersible polymer is adsorbed onto the pigment (I) and the self-dispersible pigment (II).

In this case, the configuration of the pigment water dispersion is not particularly limited. Examples of the configuration of the pigment water dispersion include (1) the configuration in which the water-dispersible polymer is adsorbed onto the surface of respective particles of the pigment (I) to form dispersed particles containing a plurality of pigment particles, and the water-dispersible polymer is also adsorbed onto the pigment (II) and dispersed in the dispersion, (2) the configuration in which the pigment (I) is enclosed or encapsulated in the water-dispersible polymer and dispersed in the dispersion, and the water-dispersible polymer is also adsorbed onto the pigment (II) and dispersed in the dispersion, (3) the configuration in which the pigment (I) is exposed onto the surface of the respective water-dispersible polymer particles and dispersed in the dispersion, and the water-dispersible polymer is also adsorbed onto the pigment (II) and dispersed in the dispersion, and (4) a combination of these configurations such as the configuration in which the water-dispersible polymer is partially adsorbed onto the surface of the respective particles of the pigments (I) and (II) and dispersed in the dispersion, and the like.

(Composition and Properties of Pigment Water Dispersion)

The total content of the pigments (I) and (II) in the pigment water dispersion is preferably not less than 3.0% by mass, more preferably not less than 5.0% by mass, even more preferably not less than 7.0% by mass, further even more preferably not less than 10% by mass and still further even more preferably not less than 12% by mass, and is also preferably not more than 20% by mass, more preferably not more than 17% by mass and even more preferably not more than 15% by mass, from the viewpoint of improving continuous ejection stability of the resulting ink as well as from the viewpoint of obtaining printed materials that have high optical density, and are excellent in fixing properties and free of occurrence of strike-through.

The mass ratio of the pigment (I) to the pigment (II) [(I)/(II)] in the pigment water dispersion is preferably from 90/10 to 10/90, more preferably from 90/10 to 25/75, even more preferably from 90/10 to 30/70, further even more preferably from 90/10 to 40/60, still further even more preferably from 90/10 to 50/50 and still further even more preferably from 90/10 to 60/40, from the viewpoint of exhibiting good synergistic effect of both the pigments and improving continuous ejection stability and fixing properties of the resulting ink.

In addition, from the viewpoint of exhibiting good synergistic effect of both the pigments and improving optical density and fixing properties of the resulting ink, the mass ratio of the pigment (I) to the pigment (II) [(I)/(II)] in the pigment water dispersion is preferably from 90/10 to 10/90, more preferably from 85/15 to 15/85, even more preferably from 80/20 to 20/80, further even more preferably from 70/30 to 20/80, still further even more preferably from 60/40 to 20/80 and still further even more preferably from 60/40 to 30/70.

The content of the water-dispersible polymer in the pigment water dispersion is preferably not less than 0.5% by mass, more preferably not less than 1.0% by mass, even more preferably not less than 2.0% by mass and further even more preferably not less than 3.0% by mass, and is also preferably not more than 15% by mass, more preferably not more than 10% by mass, even more preferably not more than 7.0% by mass and further even more preferably not more than 5.0% by mass, from the viewpoint of improving continuous ejection stability of the resulting ink as well as from the viewpoint of obtaining printed materials that have high optical density, and are excellent in fixing properties and free of occurrence of strike-through.

The content of water in the pigment water dispersion is preferably not less than 50% by mass, more preferably not less than 60% by mass and even more preferably not less than 75% by mass, and is also preferably not more than 95% by mass and more preferably not more than 90% by mass, from the viewpoint of improving continuous ejection stability of the resulting ink.

The pigment water dispersion obtained by the production process of the present invention may be mixed with various additives usually used in a water-based ink, e.g., a water-soluble organic solvent such as a wetting agent and a penetrant, a dispersant, a surfactant, a viscosity controller, a defoaming agent, a rust preventive, an antiseptic agent, a mildew-proof agent and the like, and may be directly used as a water-based ink for flexographic printing, gravure printing or ink-jet printing, preferably as a water-based ink for ink-jet printing. Examples of the water-soluble organic solvent include the below-mentioned polyhydric alcohols, polyhydric alcohol alkyl ethers, nitrogen-containing heterocyclic compounds, etc. The surfactant may be any of an anionic surfactant, a nonionic surfactant, a cationic surfactant and an amphoteric surfactant, and is preferably a nonionic surfactant.

The time of addition of various additives to the pigment water dispersion is not particularly limited. The additives may be added to the water dispersion (C) obtained in the step 1, followed by subjecting the resulting mixture to the heat treatment in the step 2. Also, the additives may be added before or during the heat treatment in the step 2 or may be added after completion of the heat treatment in the step 2. From the viewpoint of improving dispersion stability of the pigment water dispersion, the additives are preferably added after completion of the heat treatment in the step 2.

The content of the water-soluble organic solvent in the pigment water dispersion is preferably not more than 5% by mass, more preferably not more than 1% by mass, even more preferably not more than 0.1% by mass and further even more preferably not more than 0.01% by mass, and is also preferably not less than 0% by mass, from the viewpoint of improving storage stability of the pigment water dispersion.

The content of the surfactant in the pigment water dispersion is preferably not more than 2% by mass, more preferably not more than 1% by mass, even more preferably not more than 0.5% by mass and further even more preferably not more than 0.1% by mass, and is also preferably not less than 0% by mass, from the viewpoint of suppressing inclusion of foams in the pigment water dispersion.

The static surface tension of the pigment water dispersion as measured at 20° C. is preferably not less than 23 mN/m, more preferably not less than 25 mN/m and even more preferably not less than 30 mN/m, and is also preferably not more than 55 mN/m, more preferably not more than 50 mN/m and even more preferably not more than 48 mN/m, from the viewpoint of improving continuous ejection stability of the resulting ink as well as from the viewpoint of obtaining printed materials that are excellent in fixing properties and free of occurrence of strike-through.

The static surface tension of the pigment water dispersion as measured at 20° C. may be measured by the method described in Examples below.

The viscosity of the pigment water dispersion as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s, even more preferably not more than 4.0 mPa·s and further even more preferably not more than 3.0 mPa·s, from the viewpoint of improving continuous ejection stability of the resulting ink as well as from the viewpoint of obtaining printed materials that are excellent in fixing properties and free of occurrence of strike-through.

The viscosity of the pigment water dispersion as measured at 35° C. may be measured by the method described in Examples below.

[Water-Based Ink for Ink-Jet Printing]

The pigment water dispersion obtained by the production process of the present invention is preferably further mixed with at least one material selected from the group consisting of water and an organic solvent (D) and, if required, with the other additives, and used as a water-based ink for ink-jet printing (hereinafter also referred to merely as a "water-based ink"). By further mixing these components with the pigment water dispersion, it is possible to obtain a water-based ink having desired ink properties such as desirable concentration and viscosity. The water-based ink for ink-jet printing which contains the pigment water dispersion according to the present invention (hereinafter also referred to merely as a "water-based ink" or an "ink") is preferably constituted of the aforementioned pigment water dispersion, organic solvent (D) and water from the viewpoint of improving continuous ejection stability of the resulting ink as well as from the viewpoint of obtaining printed materials that have high optical density, and are excellent in fixing properties and free of occurrence of strike-through.

Meanwhile, the "water-based ink" as used in the present invention means such an ink that water has a largest content among components of a dispersing medium contained in the ink.

Examples of the organic solvent (D) include polyhydric alcohols, polyhydric alcohol alkyl ethers, nitrogen-containing heterocyclic compounds, etc.

Examples of the polyhydric alcohols include ethylene glycol, diethylene glycol, polyethylene glycol, propylene glycol, dipropylene glycol, polypropylene glycol, 1,3-propanediol, 1,3-butanediol, 1,4-butanediol, 3-methyl-1,3-butanediol, 1,5-pentanediol, 1,6-hexanediol, 2-methyl-2,4-pentanediol, 1,2,6-hexanetriol, 1,2,4-butanetriol, 1,2,3-butanetriol, petriol, triethylene glycol, tripropylene glycol, glycerin and the like. Among these polyhydric alcohols, preferred is at least one compound selected from the group consisting of glycerin, propylene glycol and diethylene glycol.

Examples of the polyhydric alcohol alkyl ethers include alkylene glycol monoalkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoisobutyl ether, tetraethylene glycol monomethyl ether, propylene glycol monoethyl ether, dipropylene glycol monobutyl ether, dipropylene glycol monomethyl ether, tripropylene glycol monomethyl ether, tripropylene glycol monobutyl ether and triethylene glycol monobutyl ether.

Examples of the nitrogen-containing heterocyclic compounds include N-methyl-2-pyrrolidone, 2-pyrrolidone, 1,3-dimethyl-2-imidazolidinone and ε-caprolactam.

These organic solvents (D) may be used alone or in combination of any two or more thereof.

The amount of the aforementioned pigment water dispersion compounded in the water-based ink is preferably not less than 10% by mass, more preferably not less than 20% by mass and even more preferably not less than 30% by mass, and is also preferably not more than 60% by mass, more preferably not more than 55% by mass and even more preferably not more than 50% by mass, from the viewpoint of improving continuous ejection stability of the resulting ink as well as from the viewpoint of obtaining printed materials that have high optical density, and are excellent in fixing properties and free of occurrence of strike-through.

(Composition and Properties of Water-Based Ink)

The total content of the pigments (I) and (II) in the water-based ink is preferably not less than 1.0% by mass, more preferably not less than 2.0% by mass and even more preferably not less than 4.0% by mass, and is also preferably not more than 20% by mass, more preferably not more than 15% by mass, even more preferably not more than 10% by mass and further even more preferably not more than 8.0% by mass, from the viewpoint of improving continuous ejection stability of the resulting ink as well as from the viewpoint of obtaining printed materials that have high optical density, and are excellent in fixing properties and free of occurrence of strike-through.

The mass ratio of the pigment (I) to the pigment (II) [(I)/(II)] in the water-based ink is preferably from 90/10 to 10/90, more preferably from 90/10 to 25/75, even more preferably from 90/10 to 30/70, further even more preferably from 90/10 to 40/60, still further even more preferably from 90/10 to 50/50 and still further even more preferably from 90/10 to 60/40, from the viewpoint of exhibiting good synergistic effect of both the pigments and improving continuous ejection stability and fixing properties of the resulting ink.

In addition, from the viewpoint of exhibiting good synergistic effect of both the pigments and improving optical density and fixing properties of the resulting ink, the mass ratio of the pigment (I) to the pigment (II) [(I)/(II)] in the water-based ink is preferably from 90/10 to 10/90, more preferably from 85/15 to 15/85, even more preferably from 80/20 to 20/80, further even more preferably from 70/30 to 20/80, still further even more preferably from 60/40 to 20/80 and still further even more preferably from 60/40 to 30/70.

The content of the water-dispersible polymer in the water-based ink is preferably not less than 0.15% by mass, more preferably not less than 0.20% by mass, even more preferably not less than 0.50% by mass, further even more preferably not less than 1.0% by mass and still further even more preferably not less than 1.5% by mass, and is also preferably not more than 5.0% by mass, more preferably not more than 3.4% by mass and even more preferably not more than 2.5% by mass, from the viewpoint of improving continuous ejection stability of the resulting ink as well as from the viewpoint of obtaining printed materials that have high optical density, and are excellent in fixing properties and free of occurrence of strike-through.

The content of the organic solvent (D) in the water-based ink is preferably not less than 3.0% by mass, more preferably not less than 5.0% by mass and even more preferably not less than 10% by mass, and is also preferably not more than 20% by mass and more preferably not more than 15% by mass, from the viewpoint of improving continuous ejection stability of the resulting ink.

The content of water in the water-based ink is preferably not less than 50% by mass, more preferably not less than 60% by mass and even more preferably not less than 75% by mass, and is also preferably not more than 95% by mass and more preferably not more than 90% by mass, from the viewpoint of improving continuous ejection stability of the resulting ink.

The static surface tension of the water-based ink as measured at 20° C. is preferably not less than 23 mN/m and more preferably not less than 25 mN/m, and is also preferably not more than 45 mN/m, more preferably not more than 40 mN/m and even more preferably not more than 35 mN/m, from the viewpoint of improving continuous ejection stability of the resulting ink as well as from the viewpoint of obtaining printed materials that are excellent in fixing properties and free of occurrence of strike-through.

The static surface tension of the water-based ink as measured at 20° C. may be measured by the method described in Examples below.

The viscosity of the water-based ink as measured at 35° C. is preferably not less than 1.0 mPa·s, more preferably not less than 1.5 mPa·s and even more preferably not less than 2.0 mPa·s, and is also preferably not more than 10 mPa·s, more preferably not more than 7.0 mPa·s, even more preferably not more than 4.0 mPa·s and further even more preferably not more than 3.0 mPa·s, from the viewpoint of improving continuous ejection stability of the resulting ink as well as from the viewpoint of obtaining printed materials that are excellent in fixing properties and free of occurrence of strike-through.

The viscosity of the water-based ink as measured at 35° C. may be measured by the method described in Examples below.

[Ink-Jet Printing Method]

The ink-jet printing method to which the water-based ink for ink-jet printing containing the pigment water dispersion according to the present invention can be applied is not particularly limited, and the water-based ink for ink-jet printing according to the present invention can be applied to any of ink ejection methods such as an electro-mechanical conversion method such as a piezoelectric method, an electro-thermal conversion method such as a thermal method.

In the water-based ink for ink-jet printing containing the pigment water dispersion according to the present invention, the water-dispersible polymer is adsorbed onto the pigment (I) and the self-dispersible pigment (II), so that the amount of the water-dispersible polymer unabsorbed onto the pigments can be reduced. When using the water-based ink for ink-jet printing in the ink-jet printing method in which the water-based ink is ejected onto a printing medium by a thermal method to print characters or images on the printing medium, it is possible to avoid occurrence of such a risk that the water-dispersible polymer unabsorbed onto the pigments is deposited and adhered onto a heat source such as a heater used in the thermal method, i.e., suppress occurrence of kogation phenomenon. In consequence, from the viewpoint of attaining good effect of suppressing occurrence of the kogation phenomenon, the water-based ink for ink-jet printing containing the pigment water dispersion according to the present invention is preferably used in a thermal type ink-jet printing method.

The water-based ink for ink-jet printing containing the pigment water dispersion according to the present invention is excellent in continuous ejection stability, optical density on a high-water absorbing printing medium and fixing properties on a low-water absorbing printing medium. For this reason, as the printing medium, there may be used various printing media including a high-water absorbing printing medium such as a plain paper and a wood-free paper; and a low-water absorbing printing medium such as an art paper, a coated paper and a synthetic resin film.

With respect to the aforementioned embodiments, the present invention further provides the following aspects relating to the pigment water dispersion and the process for producing the pigment water dispersion.

<1> A process for producing a pigment water dispersion, including the following steps 1 and 2:

Step 1: mixing a water dispersion (A) formed by dispersing a pigment (I) with a water-dispersible polymer and a water dispersion (B) of a self-dispersible pigment (II) to obtain a water dispersion (C); and Step 2: subjecting the water dispersion (C) obtained in the step 1 to heat treatment at a temperature of not lower than 40° C. to obtain the pigment water dispersion.

<2> The process for producing a pigment water dispersion according to the aspect <1>, wherein the pigment (I) is preferably a carbon black, and a DBP oil absorption of the carbon black is preferably not more than 150 mL/100 g, more preferably not more than 140 mL/100 g, even more preferably not more than 120 mL/100 g, further even more preferably not more than 100 mL/100 g, still further even more preferably not more than 80 mL/100 g and still further even more preferably not more than 60 mL/100 g, and is also preferably not less than 35 mL/100 g, more preferably not less than 40 mL/100 g, even more preferably not less than 45 mL/100 g and further even more preferably not less than 50 mL/100 g.

<3> The process for producing a pigment water dispersion according to the aspect <1> or <2>, wherein the water-dispersible polymer is a vinyl-based polymer that contains a constitutional unit derived from (a) a hydrophobic monomer and a constitutional unit derived from (b) an ionic monomer.

<4> The process for producing a pigment water dispersion according to the aspect <3>, wherein the vinyl-based polymer further contains a constitutional unit derived from (c) a nonionic monomer.

<5> The process for producing a pigment water dispersion according to the aspect <3> or <4>, wherein the hydrophobic monomer (a) is preferably at least one monomer selected from the group consisting of an aromatic group-containing monomer, a (meth)acrylate containing a hydrocarbon group derived from an aliphatic alcohol and a macromer, and more preferably at least one monomer selected from the group consisting of an aromatic group-containing monomer and a macromer.

<6> The process for producing a pigment water dispersion according to any one of the aspects <3> to <5>, wherein the ionic monomer (b) is preferably an anionic monomer, more preferably a carboxylic acid monomer, even more preferably at least one monomer selected from the group consisting of acrylic acid and methacrylic acid, and further even more preferably methacrylic acid.

<7> The process for producing a pigment water dispersion according to any one of the aspects <1> to <6>, wherein a weight-average molecular weight of the water-dispersible polymer is preferably not less than 5,000, more preferably not less than 10,000, even more preferably not less than 20,000 and further even more preferably not less than 30,000, and is also preferably not more than 500,000, more preferably not more than 300,000, even more preferably not more than 200,000, further even more preferably not more than 150,000 and still further even more preferably not more than 100,000.

<8> The process for producing a pigment water dispersion according to any one of the aspects <1> to <7>, wherein the water dispersion (A) is a water dispersion prepared by dispersing the pigment (I) with a crosslinked water-dispersible polymer.

<9> The process for producing a pigment water dispersion according to the aspect <8>, wherein the crosslinked water-dispersible polymer is produced by crosslinking the water-dispersible polymer with a crosslinking agent.

<10> The process for producing a pigment water dispersion according to the aspect <9>, wherein the crosslinking agent is preferably (ii) an epoxy group-containing compound, more preferably at least one compound selected from the group consisting of ethylene glycol diglycidyl ether, polyethylene glycol diglycidyl ether, trimethylolpropane polyglycidyl ether and pentaerythritol polyglycidyl ether, even more preferably polyethylene glycol diglycidyl ether, and further even more preferably diethylene glycol diglycidyl ether.

<11> The process for producing a pigment water dispersion according to the aspect <9> or <10>, wherein the water-dispersible polymer preferably contains a reactive group (crosslinkable functional group) capable of reacting with the crosslinking agent, and the crosslinkable functional group is preferably at least one group selected from the group consisting of an anionic group, an amino group, a hydroxy group, an isocyanate group and an epoxy group, more preferably at least one group selected from the group consisting of an anionic group, an amino group and a hydroxy group, even more preferably an anionic group, and further even more preferably a carboxy group.

<12> The process for producing a pigment water dispersion according to any one of the aspects <9> to <11>, wherein an amount of the crosslinking agent used in the crosslinking reaction is preferably not less than 0.50 part by mass, more preferably not less than 0.70 part by mass, even more preferably not less than 0.85 part by mass, further even more preferably not less than 1.0 part by mass and still further even more preferably 1.5 parts by mass, and is also preferably not more than 9.5 parts by mass, more preferably not more than 8.0 parts by mass, even more preferably not more than 7.5 parts by mass, further even more preferably not more than 7.0 parts by mass, still further even more preferably not more than 6.5 parts by mass and still further even more preferably not more than 6.0 parts by mass, on the basis of 100 parts by mass of the water-dispersible polymer.

<13> The process for producing a pigment water dispersion according to any one of the aspects <1> to <12>, further including the following step 1-1 prior to the step 1:

Step 1-1: subjecting a pigment mixture containing the water-dispersible polymer, an organic solvent, the pigment (I) and water to dispersion treatment and then removing the organic solvent from the resulting dispersion to obtain the water dispersion (A) formed by dispersing the pigment (I) with the water-dispersible polymer.

<14> The process for producing a pigment water dispersion according to the aspect <13>, wherein a content of the pigment (I) in the pigment mixture is preferably not less than 5.0% by mass, more preferably not less than 8.0% by mass and even more preferably not less than 10% by mass, and is also preferably not more than 30% by mass, more preferably not more than 25% by mass and even more preferably not more than 20% by mass.

<15> The process for producing a pigment water dispersion according to the aspect <13> or <14>, wherein a content of the water-dispersible polymer in the pigment mixture is preferably not less than 1.5% by mass, more preferably not less than 2.0% by mass and even more preferably not less than 2.5% by mass, and is also preferably not more than 15% by mass, more preferably not more than 10% by mass and even more preferably not more than 7.0% by mass.

<16> The process for producing a pigment water dispersion according to any one of the aspects <13> to <15>, wherein a content of the organic solvent in the pigment mixture is preferably not less than 10% by mass, more preferably not less than 13% by mass and even more preferably not less than 15% by mass, and is also preferably not more than 30% by mass, more preferably not more than 25% by mass and even more preferably not more than 20% by mass.

<17> The process for producing a pigment water dispersion according to any one of the aspects <13> to <16>, wherein a mass ratio of the pigment (I) to the water-dispersible polymer [pigment (I)/water-dispersible polymer] in the pigment mixture is preferably from 80/20 to 50/50, more preferably from 75/25 to 60/40 and even more preferably from 70/30 to 65/45.

<18> The process for producing a pigment water dispersion according to any one of the aspects <1> to <17>, wherein a mass ratio of the pigment (I) to the self-dispersible pigment (II) [(I)/(II)] in the step 1 is preferably from 90/10 to 10/90, more preferably from 90/10 to 25/75, even more preferably from 90/10 to 30/70, further even more preferably from 90/10 to 40/60, still further even more preferably from 90/10 to 50/50 and still further even more preferably from 90/10 to 60/40.

<19> The process for producing a pigment water dispersion according to any one of the aspects <1> to <18>, wherein a time of the heat treatment in the step 2 is preferably not less than 0.5 hour, more preferably not less than 1 hour, even more preferably not less than 2 hours and further even more preferably not less than 4 hours, and is also preferably not more than 10 hours, more preferably not more than 8 hours and even more preferably not more than 6 hours.

<20> The process for producing a pigment water dispersion according to any one of the aspects <1> to <19>, wherein a temperature used upon the heat treatment in the step 2 is not lower than 40° C. and preferably not lower than 50° C., and is also preferably not higher than 100° C., more preferably not higher than 90° C. and even more preferably not higher than 70° C.

<21> The process for producing a pigment water dispersion according to any one of the aspects <1> to <20>, wherein a total content of the pigment (I) and the self-dispersible pigment (II) in the pigment water dispersion is preferably not less than 3.0% by mass, more preferably not less than 5.0% by mass, even more preferably not less than 7.0% by mass, further even more preferably not less than 10% by mass and still further even more preferably not less than 12% by mass, and is also preferably not more than 20% by mass, more preferably not more than 17% by mass and even more preferably not more than 15% by mass.

<22> The process for producing a pigment water dispersion according to any one of the aspects <1> to <21>, wherein a content of the water-dispersible polymer in the pigment water dispersion is preferably not less than 0.5% by mass, more preferably not less than 1.0% by mass, even more preferably not less than 2.0% by mass and further even more preferably not less than 3.0% by mass, and is also preferably not more than 15% by mass, more preferably not more than 10% by mass, even more preferably not more than 7.0% by mass and further even more preferably not more than 5.0% by mass.

<23> The process for producing a pigment water dispersion according to any one of the aspects <1> to <22>, wherein a content of the water-soluble organic solvent in the pigment water dispersion is preferably not more than 5% by mass, more preferably not more than 1% by mass, even more preferably not more than 0.1% by mass and further even more preferably not more than 0.01% by mass, and is also preferably not less than 0% by mass.

<24> A use of the pigment water dispersion produced by the process according to any one of the aspects <1> to <23>, as a water-based ink for ink-jet printing.

<25> A pigment water dispersion containing a pigment (I) dispersed with a water-dispersible polymer and a self-dispersible pigment (II), in which the water-dispersible polymer is adsorbed onto the pigment (I) and the self-dispersible pigment (II).

<26> A water-based ink for ink-jet printing containing the pigment water dispersion according to the aspect <25>, an organic solvent (D) and water.

<27> The water-based ink for ink-jet printing according to the aspect <25> or <26>, wherein a content of the organic solvent (D) in the water-based ink is preferably not less than 3.0% by mass, more preferably not less than 5.0% by mass and even more preferably not less than 10% by mass, and is also preferably not more than 20% by mass and more preferably not more than 15% by mass.

<28> An ink-jet printing method including the step of ejecting the water-based ink according to any one of the aspects <25> to <27> onto a printing medium by a thermal method to print characters or images on the printing medium.

<29> A use of the water-based ink according to any one of the aspects <25> to <27>, in an ink-jet printing method in which the water-based ink is ejected onto on a printing medium by a thermal method to print characters or images on the printing medium.

EXAMPLES

In the following Production Example, Examples and Comparative Examples, the "part(s)" and "%" indicate "part(s) by mass" and "% by mass", respectively, unless otherwise specified.

Meanwhile, the weight-average molecular weight of the water-dispersible polymer, the solid contents of the water-dispersible polymer solution, respective water dispersions and pigment water dispersion, the static surface tension and viscosity of the pigment water dispersion and water-based ink, and the average particle size of the pigment particles dispersed in the water dispersion (A) with the water-dispersible polymer were measured by the following methods.

(1) Measurement of Weight-Average Molecular Weight of Water-Dispersible Polymer

The weight-average molecular weight of the water-dispersible polymer was measured by gel permeation chromatography [GPC apparatus: "HLC-8120GPC" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent, and using a polystyrene as a reference standard substance.

(2) Measurement of Solid Contents of Water-Dispersible Polymer Solution, Respective Water Dispersions and Pigment Water Dispersion Sodium sulfate dried to constant weight in a desiccator was weighed and charged in an amount of 10.0 g into a 30 mL polypropylene reaction vessel (φ: 40 mm; height: 30 mm), and about 1.0 g of a sample to be measured was added to the reaction vessel. The contents of the reaction vessel were mixed and then accurately weighed. The resulting mixture was maintained in the reaction vessel at 105° C. for 2 hours to remove volatile components therefrom, and further allowed to stand in a desiccator for 15 minutes to measure a weight thereof. The weight of the sample after removing the volatile components therefrom was regarded as a weight of solids therein. The solid content of the sample was calculated by dividing the weight of the solids by the weight of the sample initially added.

(3) Static Surface Tensions of Pigment Water Dispersion and Water-Based Ink

A platinum plate was dipped in 5 g of the pigment water dispersion or the water-based ink filled in a cylindrical polyethylene vessel (3.6 cm in diameter×1.2 cm in depth), and the static surface tension of the pigment water dispersion or the water-based ink was measured at 20° C. using a surface tension meter "CBVP-Z" (tradename) available from Kyowa Interface Science Co., Ltd.

(4) Viscosities of Pigment Water Dispersion and Water-Based Ink

The viscosity of the pigment water dispersion or the water-based ink was measured at 35° C. using an E-type viscometer "Model No.: TV-25" (equipped with a standard cone rotor (1° 34'×R24); rotating speed: 50 rpm) available from Toki Sangyo Co., Ltd.

(5) Average Particle Size of Pigment Particles Dispersed in Water Dispersion (A) with Water-Dispersible Polymer The water dispersion (A) was diluted with ion-exchanged water previously filtered through a 0.2 μm-mesh filter, and the resulting diluted dispersion was subjected to measurement of particle sizes of particles dispersed therein at 25° C. using a laser particle analyzing system "ELS-6100" available from Otsuka Electrics Co., Ltd.

<Production of Water-Dispersible Polymer>

Production Example 1

A reaction vessel equipped with two dropping funnels 1 and 2 was charged with 36 parts of benzyl acrylate, 18 parts of a styrene macromer, 27 parts of "NK ESTER EH-4E" and 24.6 parts of methyl ethyl ketone (MEK) and then with 0.3 part of a chain transfer agent (2-mercaptoethanol), and an inside atmosphere of the reaction vessel was replaced with a nitrogen gas, thereby obtaining an initially charged monomer solution.

On the other hand, 288 parts of benzyl acrylate, 162 parts of the styrene macromer, 144 parts of methacrylic acid, 216 parts of "NK ESTER EH-4E" and 362.7 parts of MEK were mixed together, and then 7.2 parts of a polymerization initiator "V-65" (tradename; 2,2'-azobis(2,4-dimethylvaleronitrile)) available from Wako Pure Chemical Industries, Ltd., and 1.89 parts of the aforementioned chain transfer agent were further mixed therewith, and the resulting mixture was fully purged with a nitrogen gas, thereby obtaining a dropping monomer solution 1. Then, the thus obtained dropping monomer solution 1 was charged into the dropping funnel 1.

Also, 36 parts of benzyl acrylate, 36 parts of methacrylic acid, 27 parts of "NK ESTER EH-4E" and 197.7 parts of MEK were mixed together, and then 1.8 parts of the aforementioned polymerization initiator and 0.54 part of the aforementioned chain transfer agent were further mixed therewith, and the resulting mixture was fully purged with a nitrogen gas, thereby obtaining a dropping monomer solution 2. Then, the thus obtained dropping monomer solution 2 was charged into the dropping funnel 2.

In a nitrogen atmosphere, the initially charged monomer solution in the reaction vessel was maintained at 75° C. while stirring, and the dropping monomer solution 1 in the dropping funnel 1 was gradually added dropwise into the reaction vessel over 3 hours. Then, the dropping monomer solution 2 in the dropping funnel 2 was also gradually added dropwise into the reaction vessel over 2 hours. After completion of the dropwise addition of the dropping monomer solutions 1 and 2, the mixed solution in the reaction vessel was stirred at 75° C. for 2 hours.

Next, a polymerization initiator solution prepared by dissolving 1.35 parts of the aforementioned polymerization initiator in 18 parts of MEK was added to the mixed solution, and the resulting reaction solution was aged while stirring at 75° C. for 1 hour. The aforementioned procedure including the preparation and addition of the polymerization initiator solution and the aging of the reaction solution was repeated two more times. Then, the reaction solution in the reaction vessel was maintained at 85° C. for 2 hours, thereby obtaining a water-dispersible polymer solution. A part of the resulting water-dispersible polymer was dried to measure a molecular weight of the polymer. As a result, it was confirmed that the weight-average molecular weight of the water-dispersible polymer was 50,000.

The solid content of the thus obtained water-dispersible polymer solution was measured, and the water-dispersible polymer solution was diluted with MEK until the solid content thereof was reduced to 38%.

TABLE 1

|  |  | Reaction vessel Initially charged monomer solution | Dropping funnel 1 Dropping monomer solution 1 | Dropping funnel 2 Dropping monomer solution 2 |
|---|---|---|---|---|
| Monomer composition (active ingredients) (part(s)) | (a) Benzyl acrylate | 36 | 288 | 36 |
| | (a) Styrene macromer*[1] | 18 | 162 | 0 |
| | (b) Methacrylic acid | 0 | 144 | 36 |
| | (c) "NK ESTER EH-4E"*[2] | 27 | 216 | 27 |
| Organic solvent (part(s)) | MEK* | 24.6 | 362.7 | 197.7 |
| Polymerization initiator (part(s)) | "V-65"*[3] | 0 | 7.2 | 1.8 |
| Chain transfer agent (part(s)) | 2-Mercaptoethanol | 0.3 | 1.89 | 0.54 |
| Weight-average molecular weight of water-dispersible polymer obtained | | | 50,000 | |

The details of the respective asterisked signs shown in Table 1 are as follows.
*[1] "AS-6S" (tradename; number-average molecular weight: 6,000; segment: styrene; toluene solution; solid content: 51%) available from Toagosei Co., Ltd.
*[2] Octoxy polyethylene glycol monomethacrylate; "NK ESTER EH-4E" (tradename; average molar number of addition of ethyleneoxide: 4; end group: 2-ethylhexyl group) available from Shin-Nakamura Chemical Co., Ltd.
*[3] 2,2'-Azobis(2,4-dimethylvaleronitrile); "V-65" (tradename) available from Wako Pure Chemical Industries, Ltd.

The details of the pigments used in the following Examples and Comparative Examples are as follows.

Nipex160IQ: Carbon black "NIpex160IQ" (DPB oil absorption: 128 mL/100 g; volatile content: 5.0%) available from Evonik Degussa GmbH M717: Carbon black "MONARCH 717" (DPB oil absorption: 53 mL/100 g; volatile content: 1.0%) available from Cabot Corporation 6338JC: Cyan pigment "CFB6338JC" available from Dainichiseika Color & Chemicals Mfg. Co., Ltd.

SDP100: Self-dispersible carbon black water dispersion "SENSIJET BLACK SDP100" (solid content: 14%) available from Sensient Technologies Corporation SDP2000: Self-dispersible carbon black water dispersion "SENSIJET BLACK SDP2000" (solid content: 14%) available from Sensient Technologies Corporation JET450C: Self-dispersible cyan pigment water dispersion "CAB-O-JET 450C" (solid content: 14%) available from Cabot Corporation <Production of Pigment Water Dispersion>

Example 1

(Step 1-1)

A 2 L-capacity disper "T.K. ROBOMIX" (equipped with "HOMODISPER 2.5 Model" as a stirring device; blade diameter: 40 mm) available from Primix Corporation was charged with 34 parts of the water-dispersible polymer solution (solid content: 38%) obtained in Production Example 1. While stirring the polymer solution in the disper at 1400 rpm, 11 parts of MEK as an organic solvent was added to the polymer solution, and then 100 parts of ion-exchanged water and 5.7 parts of a 5N (16.9%) sodium hydroxide aqueous solution were further added thereto. The resulting reaction solution was stirred at 1400 rpm for 15 minutes while cooling the solution in a water bath at 0° C.

After the stirring, 30 parts of "Nipex160IQ" available from Evonik Degussa GmbH as the pigment (I) was added to the obtained solution, and the resulting mixture was stirred at 8,000 rpm for 1 hour to obtain a pigment mixture.

The thus obtained pigment mixture was subjected to dispersion treatment by passing the pigment mixture through a Microfluidizer "Model M-140K" (tradename) available from Microfluidics Corporation under a pressure of 150 MPa 15 times, thereby obtaining a dispersion treatment product.

Then, using a vacuum distillation apparatus (rotary evaporator) "N-1000S" (tradename) available from Tokyo Rikakikai Co., Ltd., the resulting dispersion treatment product was maintained in a warm bath adjusted to 40° C. under a pressure of 0.02 MPa for 2 hours to remove the organic solvent (MEK) therefrom. The obtained reaction solution was further maintained in the warm bath for 4 hours under such a condition that the temperature of the warm bath was adjusted to 62° C. and the pressure within the apparatus was reduced to 0.01 MPa to remove the organic solvent (MEK) and a part of water therefrom, thereby controlling a total solid content of the pigment and the water-dispersible polymer therein to 20%. Next, the resulting reaction mixture was filtered through a 2.5 μm-mesh filter "20L-MPX-025XS" (tradename) available from ROKI Co., Ltd., thereby obtaining a water dispersion (A-1) of the pigment particles dispersed with the non-crosslinked polymer subjected to no crosslinking step (solid content: 20%).

The content of the organic solvent (MEK) in the thus obtained water dispersion (A-1) of the pigment particles was 90 ppm (0.009% by mass). Meanwhile, the average particle size of the pigment particles dispersed in the water dispersion (A-1) with the non-crosslinked polymer was 109.8 nm.

(Step 1)

The water dispersion (A-1) obtained in the step 1-1 and "SDP100" in the form of a self-dispersible pigment dispersion as the water dispersion (B) were mixed with each other such that the mass ratio between the pigments [(I)/(II)] was 50/50. While stirring the resulting mixed dispersion with a stirrer, a 1N sodium hydroxide aqueous solution was added dropwise to the dispersion to control a pH value thereof to 9.0, and then ion-exchanged water was added to the resulting dispersion so as to adjust a solid content thereof to 16%, thereby obtaining a water dispersion (C-1).

(Step 2)

The water dispersion (C-1) obtained in the step 1 was subjected to heat treatment at 40° C. for 5 hours, thereby obtaining a pigment water dispersion (solid content: 16%) according to the present invention.

Specifically, the heat treatment was carried out as follows. That is, the dispersion (C-1) was filled in a heat-resistant glass vessel in a hermetically sealed state, and then subjected to the heat treatment while stirring in a constant-temperature bath (water bath) such that the temperature of the water dispersion in the heat-resistant glass vessel was 40° C.

In addition, the resulting pigment water dispersion was subjected to centrifugal separation to allow particles including the pigment to precipitate from the dispersion and thereby obtain a supernatant solution. As a result of measuring a solid content of the thus obtained supernatant solution, it was confirmed that the solid content of the supernatant solution separated from the pigment water dispersion was lower than a solid content of a supernatant solution separated from the water dispersion (A-1) obtained under the same conditions as used above. Since the solid components contained in the supernatant solution were due to the water-dispersible polymer that remains unabsorbed onto the pigment, it was suggested that the water-dispersible polymer unabsorbed onto the pigment (I) in the water dispersion (A-1) was adsorbed onto the pigment (II) by conducting the steps 1 and 2.

It was also confirmed that the content of the water-soluble organic solvent in the pigment water dispersion obtained in Example 1 was 40 ppm (0.004% by mass).

Examples 2 to 6

In Examples 2 to 4, the same procedure as in Example 1 was repeated except that the heating temperature in the step 2 was changed to those shown in Table 2; and in Examples 5 and 6, the same procedure as in Example 2 was repeated except that the heating time in the step 2 was changed to those shown in Table 2, thereby obtaining respective pigment water dispersions.

Example 7

(Step 1-1)

The water dispersion (A-1) of the pigment particles dispersed with the non-crosslinked polymer was produced by the same method as in Example 1. [Crosslinking Step]

Next, 0.26 part of "DENACOL EX-850L" (diethylene glycol diglycidyl ether; epoxy equivalent: 120) as a crosslinking agent available from Nagase ChemteX Corporation was added to 80 parts of the water dispersion (A-1) (solid content: 20% among which the content of the water-dispersible polymer was 4.8 parts), and 1.4 parts of ion-exchanged water was further added thereto, followed by stirring the resulting dispersion at 70° C. for 1.5 hours. Thereafter, 0.2 part of "Ploxel LVS" (1,2-benzisothiazol-3 (2H)-one; active ingredient content: 20%; a mildew-proof agent) available from Arch Chemicals Japan Inc., and 0.9 part of ion-exchanged water were added to the dispersion, followed by stirring the resulting mixture at 70° C. for 1 hour, thereby obtaining a water dispersion (A-7) of the pigment particles dispersed with the crosslinked polymer (solid content: 20%). At this time, the amount of the crosslinking agent used was 5.4 parts on the basis of 100 parts of the water-dispersible polymer.

(Step 1)

The water dispersion (A-7) obtained in the step 1-1 and "SDP100" in the form of a self-dispersible pigment dispersion as the water dispersion (B) were mixed with each other such that the mass ratio between the pigments [(I)/(II)] was 75/25. While stirring the resulting mixed dispersion with a stirrer, a 1N sodium hydroxide aqueous solution was added dropwise to the dispersion so as to adjust a pH value thereof to 9.0, and then ion-exchanged water was added to the resulting dispersion so as to adjust a solid content thereof to 16%, thereby obtaining a water dispersion (C-7).

(Step 2)

The water dispersion (C-7) obtained in the step 1 was subjected to heat treatment at 40° C. for 5 hours, thereby obtaining a pigment water dispersion (solid content: 16%) according to the present invention.

Specifically, the heat treatment was carried out as follows. That is, the dispersion (C-7) was filled in a heat-resistant glass vessel in a hermetically sealed state, and then subjected to the heat treatment while stirring in a constant-temperature bath (water bath) such that the temperature of the water dispersion in the heat-resistant glass vessel was 40° C.

Examples 8 to 14

In Examples 8 to 10, the same procedure as in Example 7 was repeated except that the heating temperature in the step 2 was changed to those shown in Table 3; in Examples 11 and 12, the same procedure as in Example 8 was repeated except that the heating time in the step 2 was changed to those shown in Table 3; and in Examples 13 and 14, the same procedure as in Example 8 was repeated except that the mass ratio between the pigments (I) and (II) [(I)/(II)] was changed to those shown in Table 3, thereby obtaining respective pigment water dispersions.

Example 15

The same procedure as in Example 7 was repeated except that as the water dispersion (A), there was used the water dispersion (A-15) of the pigment particles dispersed with the crosslinked polymer which was obtained by the same method as in Example 7 except that the pigment (I) was replaced with "M717", thereby obtaining a pigment water dispersion.

Meanwhile, the average particle size of the pigment particles dispersed in the water dispersion (A-15) with the crosslinked polymer was 97.8 nm.

Examples 16 to 25

In Examples 16 to 18, the same procedure as in Example 15 was repeated except that the heating temperature in the step 2 was changed to those shown in Table 4; in Examples 19 and 20, the same procedure as in Example 16 was repeated except that the heating time in the step 2 was changed to those shown in Table 4; and in Examples 21 to 25, the same procedure as in Example 16 was repeated except that the mass ratio between the pigments (I) and (II) [(I)/(II)] was changed to those shown in Table 5, thereby obtaining respective pigment water dispersions.

Example 26

The same procedure as in Example 16 was repeated except that "SDP100" as the water dispersion (B) was replaced with "SDP2000", thereby obtaining a pigment water dispersion.

Example 27

The same procedure as in Example 16 was repeated except that the pigment (I) used in the water dispersion (A) was replaced with "CFB6338JC", the water dispersion (B) was replaced with "CAB-O-JET 450C", and the mass ratio between the pigments (I) and (II) [(I)/(II)] was changed to 50/50, thereby obtaining a pigment water dispersion.

The pigment water dispersion obtained in Example 1 had a static surface tension of 46 mN/m and a viscosity of 2.4 mPa·s. In addition, the pigment water dispersions obtained in Examples 2 to 27 had a static surface tension of 40 to 49 mN/m and a viscosity of 1.9 to 2.9 mPa·s.

Comparative Example 1

The same procedure as in Example 1 was repeated except that no step 2 was carried out, thereby obtaining a pigment water dispersion.

Comparative Examples 2 and 3

No step 1 was carried out, and "SDP100" was used as the water dispersion (B), and in Comparative Example 2, the water dispersion (B) was subjected to no heat treatment in the step 2 and directly used as a pigment water dispersion, whereas in Comparative Example 3, the water dispersion (B) was subjected to heat treatment as the step 2 at 60° C. for 5 hours, thereby obtaining a pigment water dispersion.

Comparative Examples 4 to 9

The dispersions shown in Table 7 were respectively used as the water dispersion (A), and in Comparative Examples 4, 6 and 8, the respective dispersions were subjected to neither step 1 nor step 2 and directly used as respective pigment water dispersions, whereas in Comparative Examples 5, 7 and 9, the respective dispersions were subjected to no step 1, and subjected to heat treatment as the step 2 at 60° C. for 5 hours, thereby obtaining respective pigment water dispersions.

Comparative Example 10

The same procedure as in Example 1 was repeated except that the pigment (I) used in the water dispersion (A) was replaced with "CFB6338JC", the water dispersion (B) was replaced with "CAB-O-JET 450C", and no step 2 was carried out, thereby obtaining a pigment water dispersion.

Comparative Example 11

The water dispersions (A) and (B) as shown in Table 7 were respectively used and individually subjected to heat treatment at 60° C. for 5 hours. Thereafter, the water dispersions (A) and (B) were mixed with each other such that the mass ratio between the pigments was 75/25. While stirring the resulting mixed dispersion with a stirrer, a 1N sodium hydroxide aqueous solution was added dropwise to the dispersion so as to adjust a pH value thereof to 9.0, and then ion-exchanged water was added to the resulting dispersion so as to adjust a solid content thereof to 16%, thereby obtaining a pigment water dispersion.

<Production of Water-Based Inks>

Examples I-1 to I-27 and Comparative Examples IC-1 to IC-11

The pigment water dispersions (solid content: 16%) obtained in Examples 1 to 27 and Comparative Examples 1 to 11 were respectively formulated to prepare a water-based ink such that the concentration of the pigment in the obtained water-based ink was 5%, and mixed with 12 parts of "PEG 400", 0.4 part of "SURFYNOL 104", 0.8 part of "EMULGEN 120" and 40 parts of ion-exchanged water. The resulting mixed solution was filtered through a 0.3 μm-mesh filter "20L-MBP-003XS" (tradename) available from ROKI Co., Ltd., thereby obtaining water-based inks 1 to 27 and water-based inks C1 to C11.

The water-based ink obtained in Example 1-1 had a static surface tension of 28 mN/m and a viscosity of 2.3 mPa·s. In addition, the water-based inks obtained in Examples 1-2 to 1-27 had a static surface tension of 26 to 30 mN/m and a viscosity of 1.9 to 2.5 mPa·s.

The resulting water-based inks were used to prepare ink-jet printed materials as described in the following item (1), and the thus prepared ink-jet printed materials were evaluated by the methods described in the following items (2) to (4). The evaluation results are shown in Tables 2 to 7.

(1) Preparation of Ink-Jet Printed Materials

Using a thermal ink-jet printer "LPP-6010N" (tradename) available from LG Electronics Inc., which was modified by drawing a feed tube out of the printer and introducing the tube into an ink pot to allow the printer to be ready for printing, 100%-Duty printing was conducted in Best Mode at a resolution of 1600 dpi in vertical direction×1600 dpi in lateral direction under environmental conditions of a temperature of 25+1° C. and a relative humidity of 30±5%, thereby obtaining a printed material.

Meanwhile, a plain paper "All-in One paper" available from Office Maxs was used as a high-water absorbing printing medium for measurement of optical density, and a coated paper "HP Everyday photo paper glossy" available from Hewlett-Packard Company was used as a low-water absorbing printing medium for evaluation of fixing properties.

(2) Evaluation of Continuous Ejection Stability

Continuous printing was conducted on sheets of A4 size plain paper to count and measure the number of sheets of A4 size plain paper until an optical density value of printed ink on a predetermined sheet of A4 size plain paper was lower than that on the 1st sheet of A4 size plain paper. When the number of sheets of A4 size plain paper as measured above was not less than 9,000 sheets, the ink was capable of exhibiting sufficient ejection performance and could be used in practical applications. The number of sheets of A4 size plain paper as measured above is preferably not less than 13,000 sheets, more preferably not less than 15,000 sheets, even more preferably not less than 18,000 sheets and further even more preferably not less than 20,000 sheets.

(3) Measurement of Optical Density of Ink on High-Water Absorbing Printing Medium The optical density (value outputted as optical density of black images) of the printed material prepared on the plain paper in the aforementioned item (1) was measured at five points in total using a Macbeth densitometer "SpectroEye" (part number) available from GretagMacbeth GmbH under the following measuring conditions: observation viewing angle: 2°; observation light source: $D_{65}$; reference white level: Abs; polarizing filter: none; density standard: DIN, and an average value of the thus measured five values was calculated. When the thus determined optical density value was not less than 0.95, the ink was capable of exhibiting sufficient printing quality on a high-water absorbing printing medium and could be used in practical applications. The optical density value of the printed material prepared on a high-water absorbing printing medium is preferably not less than 1.00. more preferably not less than 1.05 and even more preferably not less than 1.09.

(4) Evaluation of Fixing Properties of Ink on Low-Water Absorbing Printing Medium A plain paper "Engineering Bond Paper" available from Océ A Canon Company was attached onto a bottom surface (1 inch×1 inch) of a 460 g stainless steel weight through a double sided adhesive tape.

Next, the paper-attached stainless steel weight was placed on a printed surface of the printed material obtained on the coated paper in the aforementioned item (1) such that the printed surface was brought into contact with the plain paper attached onto the bottom surface of the stainless steel weight, and the solid image printing portion of the printed material was reciprocatively rubbed in a region of 4 inches in width with the plain paper attached, 10 times. Thereafter, the values outputted as an optical density of black images transferred onto the plain paper attached onto the bottom surface of the stainless steel weight were measured using the aforementioned Macbeth densitometer under the same conditions as described above, and then an average value of the thus measured values was calculated. When the optical density value was not more than 0.05, the ink was capable of exhibiting sufficient fixing properties on a low-water absorbing printing medium and could be used in practical applications. The optical density value on a low-water absorbing printing medium is preferably not more than 0.03.

TABLE 2

|  |  |  | Examples | | | | | |
| --- | --- | --- | --- | --- | --- | --- | --- | --- |
|  |  |  | 1 | 2 | 3 | 4 | 5 | 6 |
| Step 1 | Water dispersion (A) | Pigment (I) | NIPex 160IQ | NIPex 160IQ | NIPex 160IQ | NIPex 160IQ | NIPex 160IQ | NIPex 160IQ |
|  |  | Kind of water-dispersible polymer | Non-crosslinked polymer | Non-crosslinked polymer | Non-crosslinked polymer | Non-crosslinked polymer | Non-crosslinked polymer | Non-crosslinked polymer |
|  |  | Water dispersion (B) | SDP100 | SDP100 | SDP100 | SDP100 | SDP100 | SDP100 |
|  |  | Mass ratio [(I)/(II)] | 50/50 | 50/50 | 50/50 | 50/50 | 50/50 | 50/50 |
| Step 2 |  | Heating temperature | 40° C. | 60° C. | 80° C. | 100° C. | 60° C. | 60° C. |
|  |  | Heating time | 5 h | 5 h | 5 h | 5 h | 2.5 h | 7.5 h |

|  |  | Examples | | | | | |
| --- | --- | --- | --- | --- | --- | --- | --- |
|  |  | I-1 | I-2 | I-3 | I-4 | I-5 | I-6 |
| Evaluation | Continuous ejection stability (number of sheets of A4 size paper) | 13250 | 17490 | 13250 | 10600 | 13250 | 15000 |
|  | Optical density | 1.10 | 1.10 | 1.10 | 1.10 | 1.10 | 1.10 |
|  | Fixing properties | 0.05 | 0.05 | 0.05 | 0.05 | 0.05 | 0.05 |

TABLE 3

|  |  |  | Examples | | | |
| --- | --- | --- | --- | --- | --- | --- |
|  |  |  | 7 | 8 | 9 | 10 |
| Step 1 | Water dispersion (A) | Pigment (I) | NIPex 160IQ | NIPex 160IQ | NIPex 160IQ | NIPex 160IQ |
|  |  | Kind of water-dispersible polymer | Crosslinked polymer | Crosslinked polymer | Crosslinked polymer | Crosslinked polymer |
|  |  | Water dispersion (B) | SDP100 | SDP100 | SDP100 | SDP100 |
|  |  | Mass ratio [(I)/(II)] | 75/25 | 75/25 | 75/25 | 75/25 |
| Step 2 |  | Heating temperature | 40° C. | 60° C. | 80° C. | 100° C. |
|  |  | Heating time | 5 h | 5 h | 5 h | 5 h |

|  |  | Examples | | | |
| --- | --- | --- | --- | --- | --- |
|  |  | I-7 | I-8 | I-9 | I-10 |
| Evaluation | Continuous ejection stability (number of sheets of A4 size paper) | 18020 | 19080 | 18020 | 10600 |
|  | Optical density | 1.09 | 1.09 | 1.09 | 1.09 |
|  | Fixing properties | 0.05 | 0.05 | 0.05 | 0.05 |

|  |  |  | Examples | | | | | |
| --- | --- | --- | --- | --- | --- | --- | --- | --- |
|  |  |  | 11 | 8 | 12 | 8 | 13 | 14 |
| Step 1 | Water dispersion (A) | Pigment (I) | NIPex 160IQ | NIPex 160IQ | NIPex 160IQ | NIPex 160IQ | NIPex 160IQ | NIPex 160IQ |
|  |  | Kind of | Crosslinked | Crosslinked | Crosslinked | Crosslinked | Crosslinked | Crosslinked |

TABLE 3-continued

|  |  | water-dispersible polymer | polymer | polymer | polymer | polymer | polymer | polymer |
|---|---|---|---|---|---|---|---|---|
|  |  | Water dispersion (B) | SDP100 | SDP100 | SDP100 | SDP100 | SDP100 | SDP100 |
|  |  | Mass ratio [(I)/(II)] | 75/25 | 75/25 | 75/25 | 75/25 | 50/50 | 25/75 |
| Step 2 |  | Heating temperature | 60° C. | 60° C. | 60° C. | 60° C. | 60° C. | 60° C. |
|  |  | Heating time | 2.5 h | 5 h | 7.5 h | 5 h | 5 h | 5 h |

|  |  | Examples | | | | | |
|---|---|---|---|---|---|---|---|
|  |  | I-11 | I-8 | I-12 | I-8 | I-13 | I-14 |
| Evaluation | Continuous ejection stability (number of sheets of A4 size paper) | 19080 | 19080 | 19080 | 19080 | 18020 | 10600 |
|  | Optical density | 1.09 | 1.09 | 1.09 | 1.09 | 1.10 | 1.10 |
|  | Fixing properties | 0.05 | 0.05 | 0.05 | 0.05 | 0.05 | 0.05 |

TABLE 4

|  |  |  | Examples | | | |
|---|---|---|---|---|---|---|
|  |  |  | 15 | 16 | 17 | 18 |
| Step 1 | Water dispersion (A) | Pigment (I) | M717 | M717 | M717 | M717 |
|  |  | Kind of water-dispersible polymer | Crosslinked polymer | Crosslinked polymer | Crosslinked polymer | Crosslinked polymer |
|  |  | Water dispersion (B) | SDP100 | SDP100 | SDP100 | SDP100 |
|  |  | Mass ratio [(I)/(II)] | 75/25 | 75/25 | 75/25 | 75/25 |
| Step 2 |  | Heating temperature | 40° C. | 60° C. | 80° C. | 100° C. |
|  |  | Heating time | 5 h | 5 h | 5 h | 5 h |

|  |  | Examples | | | |
|---|---|---|---|---|---|
|  |  | I-15 | I-16 | I-17 | I-18 |
| Evaluation | Continuous ejection stability (number of sheets of A4 size paper) | 18020 | 19080 | 18020 | 10600 |
|  | Optical density | 1.05 | 1.05 | 1.05 | 1.05 |
|  | Fixing properties | 0.03 | 0.03 | 0.03 | 0.03 |

|  |  |  | Examples | | |
|---|---|---|---|---|---|
|  |  |  | 19 | 16 | 20 |
| Step 1 | Water dispersion (A) | Pigment (I) | M717 | M717 | M717 |
|  |  | Kind of water-dispersible polymer | Crosslinked polymer | Crosslinked polymer | Crosslinked polymer |
|  |  | Water dispersion (B) | SDP100 | SDP100 | SDP100 |
|  |  | Mass ratio [(I)/(II)] | 75/25 | 75/25 | 75/25 |
| Step 2 |  | Heating temperature | 60° C. | 60° C. | 60° C. |
|  |  | Heating time | 2.5 h | 5 h | 7.5 h |

|  |  | Examples | | |
|---|---|---|---|---|
|  |  | I-19 | I-16 | I-20 |
| Evaluation | Continuous ejection stability (number of sheets of A4 size paper) | 19080 | 19080 | 19080 |
|  | Optical density | 1.05 | 1.05 | 1.05 |
|  | Fixing properties | 0.03 | 0.03 | 0.03 |

TABLE 5

|  |  |  | Examples | | | | | |
|---|---|---|---|---|---|---|---|---|
|  |  |  | 21 | 22 | 23 | 16 | 24 | 25 |
| Step 1 | Water dispersion (A) | Pigment (I) | M717 | M717 | M717 | M717 | M717 | M717 |
|  |  | Kind of water-dispersible polymer | Crosslinked polymer | Crosslinked polymer | Crosslinked polymer | Crosslinked polymer | Crosslinked polymer | Crosslinked polymer |

TABLE 5-continued

|  |  | | | | | | |
|---|---|---|---|---|---|---|---|
| Step 2 | Water dispersion (B) | SDP100 | SDP100 | SDP100 | SDP100 | SDP100 | SDP100 |
|  | Mass ratio [(I)/(II)] | 90/10 | 85/15 | 80/20 | 75/25 | 50/50 | 25/75 |
|  | Heating temperature | 60° C. | 60° C. | 60° C. | 60° C. | 60° C. | 60° C. |
|  | Heating time | 5 h | 5 h | 5 h | 5 h | 5 h | 5 h |

| | | Examples | | | | | |
|---|---|---|---|---|---|---|---|
| | | I-21 | I-22 | I-23 | I-16 | I-24 | I-25 |
| Evaluation | Continuous ejection stability (number of sheets of A4 size paper) | 23850 | 22790 | 21200 | 19080 | 18020 | 9540 |
| | Optical density | 0.97 | 1.01 | 1.03 | 1.05 | 1.10 | 1.09 |
| | Fixing properties | 0.03 | 0.03 | 0.03 | 0.03 | 0.03 | 0.05 |

TABLE 6

| | | | Examples | | |
|---|---|---|---|---|---|
| | | | 16 | 26 | 27 |
| Step 1 | Water dispersion (A) | Pigment (I) | M717 | M717 | 6338JC |
| | | Kind of water-dispersible polymer | Crosslinked polymer | Crosslinked polymer | Crosslinked polymer |
| | Water dispersion (B) | | SDP100 | SDP2000 | JET450C |
| | Mass ratio [(I)/(II)] | | 75/25 | 75/25 | 50/50 |
| Step 2 | Heating temperature | | 60° C. | 60° C. | 60° C. |
| | Heating time | | 5 h | 5 h | 5 h |

| | | Examples | | |
|---|---|---|---|---|
| | | I-16 | I-26 | I-27 |
| Evaluation | Continuous ejection stability (number of sheets of A4 size paper) | 19080 | 19080 | 18020 |
| | Optical density | 1.05 | 1.00 | 0.95 |
| | Fixing properties | 0.03 | 0.03 | 0.03 |

TABLE 7

| | | | Comparative Examples | | | | | |
|---|---|---|---|---|---|---|---|---|
| | | | 1 | 2 | 3 | 4 | 5 | 6 |
| Step 1 | Water dispersion (A) | Kind | A-1 | — | — | A-1 | A-1 | A-7 |
| | | Pigment (I) | NIPex 160IQ | — | — | NIPex 160IQ | NIPex 160IQ | NIPex 160IQ |
| | | Kind of water-dispersible polymer | Non-crosslinked polymer | — | — | Non-crosslinked polymer | Non-crosslinked polymer | Crosslinked polymer |
| | Water dispersion (B) | | SDP100 | SDP100 | SDP100 | — | — | — |
| | Mass ratio [I/(II)] | | 50/50 | 0/100 | 0/100 | 100/0 | 100/0 | 100/0 |
| Step 2 | Heating temperature | | Non-heated | Non-heated | 60° C. | Non-heated | 60° C. | Non-heated |
| | Heating time | | — | — | 5 h | — | 5 h | — |

| | | Comparative Examples | | | | | |
|---|---|---|---|---|---|---|---|
| | | IC-1 | IC-2 | IC-3 | IC-4 | IC-5 | IC-6 |
| Evaluation | Continuous ejection stability (number of sheets of A4 size paper) | 7950 | 2385 | 2385 | 19080 | 19080 | 26500 |
| | Optical density | 1.10 | 1.05 | 1.05 | 0.91 | 0.91 | 0.91 |
| | Fixing properties | 0.05 | 0.21 | 0.21 | 0.05 | 0.05 | 0.05 |

| | | | Comparative Examples | | | | |
|---|---|---|---|---|---|---|---|
| | | | 7 | 8 | 9 | 10 | 11 |
| Step 1 | Water dispersion | Kind | A-7 | A-15 | A-15 | — | A-7 |
| | | Pigment (I) | NIPex | M717 | M717 | 6338JC | NIPex |

TABLE 7-continued

| | | IC-7 | IC-8 | IC-9 | IC-10 | IC-11 |
|---|---|---|---|---|---|---|
| | Kind of water-dispersible polymer | 160IQ Crosslinked polymer | Crosslinked polymer | Crosslinked polymer | Non-crosslinked polymer | 160IQ Crosslinked polymer |
| | Water dispersion (B) | — | — | — | JET450C | SDP100 |
| | Mass ratio [(I)/(II)] | 100/0 | 100/0 | 100/0 | 50/50 | 75/25 |
| Step 2 | Heating temperature | 60° C. | Non-heated | 60° C. | Non-heated | *1 |
| | Heating time | 5 h | — | 5 h | — | 5 h |

| | | Comparative Examples | | | | |
|---|---|---|---|---|---|---|
| | | IC-7 | IC-8 | IC-9 | IC-10 | IC-11 |
| Evaluation | Continuous ejection stability (number of sheets of A4 size paper) | 26500 | 26500 | 26500 | 7950 | 8050 |
| | Optical density | 0.91 | 0.93 | 0.93 | 0.95 | 1.10 |
| | Fixing properties | 0.05 | 0.03 | 0.03 | 0.03 | 0.05 |

Note
*1: Step 1 was conducted after individually subjecting respective dispersions (A) and (B) to heat treatment at 60° C.

From Tables 2 to 7, it was confirmed that the water-based inks produced by mixing the respective pigment water dispersions obtained in Examples 1 to 27 were capable of satisfying all of high optical density, excellent continuous ejection stability and excellent fixing properties as compared to those water-based inks produced by mixing the respective pigment water dispersions obtained in Comparative Examples 1 to 11.

The invention claimed is:

1. A process for producing a pigment water dispersion, comprising the following steps 1 and 2:
   Step 1: mixing a water dispersion (A) formed by dispersing a pigment (I) with a water-dispersible polymer and a water dispersion (B) of a self-dispersible pigment (II) to obtain a water dispersion (C); and
   Step 2: subjecting the water dispersion (C) obtained in the step 1 to heat treatment at a temperature of not lower than 40° C. to obtain the pigment water dispersion.

2. The process for producing a pigment water dispersion according to claim 1, wherein a time of the heat treatment in the step 2 is not less than 0.5 hour.

3. The process for producing a pigment water dispersion according to claim 1, wherein a temperature used upon the heat treatment in the step 2 is not higher than 100° C.

4. The process for producing a pigment water dispersion according to claim 1, wherein the water dispersion (A) is a water dispersion formed by dispersing the pigment (I) with a crosslinked water-dispersible polymer.

5. The process for producing a pigment water dispersion according to claim 1, wherein a mass ratio of the pigment (I) to the self-dispersible pigment (II) in the step 1 is from 90/10 to 25/75.

6. The process for producing a pigment water dispersion according to claim 1, further comprising the following step 1-1 prior to the step 1:
   Step 1-1: subjecting a pigment mixture comprising the water-dispersible polymer, an organic solvent, the pigment (I) and water to dispersion treatment and then removing the organic solvent from the resulting dispersion to obtain the water dispersion (A) formed by dispersing the pigment (I) with the water-dispersible polymer.

7. The process for producing a pigment water dispersion according to claim 1, wherein the pigment (I) is a carbon black having a DBP oil absorption of not more than 140 mL/100 g.

8. The process for producing a pigment water dispersion according to claim 1, wherein a total content of the pigment (I) and the self-dispersible pigment (II) in the pigment water dispersion is not less than 10% by mass and not more than 20% by mass.

9. The process for producing a pigment water dispersion according to claim 1, wherein a content of the water-dispersible polymer in the pigment water dispersion is not less than 3.0% by mass and not more than 10% by mass.

10. The process for producing a pigment water dispersion according to claim 1, wherein a content of a water-soluble organic solvent in the pigment water dispersion is not less than 0% by mass and not more than 5% by mass.

11. The process for producing a pigment water dispersion according to claim 1, wherein the water-dispersible polymer is a vinyl-based polymer that comprises a constitutional unit derived from (a) a hydrophobic monomer and a constitutional unit derived from (b) an ionic monomer.

12. The process for producing a pigment water dispersion according to claim 11, wherein the vinyl-based polymer further comprises a constitutional unit derived from (c) a nonionic monomer.

13. The process for producing a pigment water dispersion according to claim 1, wherein the hues of the pigments (I) and (II) are identical to each other.

14. The process for producing a pigment water dispersion according to claim 1, wherein the water dispersion (A) is a water dispersion prepared by dispersing the pigment (I) with a crosslinked water-dispersible polymer.

15. The process for producing a pigment water dispersion according to claim 6, wherein, in the step 1-1, after removing the organic solvent, a crosslinking agent is further added to the resulting water dispersion to subject the water-dispersible polymer in the water dispersion to crosslinking reaction with the crosslinking agent.

16. The process for producing a pigment water dispersion according to claim 15, wherein the crosslinking agent is an epoxy group-containing compound.

17. The process for producing a pigment water dispersion according to claim 16, wherein the water-dispersible polymer comprises a reactive group capable of reacting with the crosslinking agent, and the reactive group is a carboxy group.

* * * * *